(12) United States Patent
Fukuhara

(10) Patent No.: US 10,240,950 B2
(45) Date of Patent: Mar. 26, 2019

(54) SCALE, MEASURING APPARATUS, IMAGE FORMATION APPARATUS, SCALE FABRICATING UNIT, AND SCALE FABRICATION METHOD

(71) Applicant: CANON KABUSHIKI KAISHA, Tokyo (JP)

(72) Inventor: Takashi Fukuhara, Higashikurume (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 547 days.

(21) Appl. No.: 14/589,411

(22) Filed: Jan. 5, 2015

(65) Prior Publication Data

US 2015/0192434 A1   Jul. 9, 2015

(30) Foreign Application Priority Data

Jan. 7, 2014   (JP) ................................ 2014-001201

(51) Int. Cl.
*G01D 5/347*   (2006.01)
*B23K 26/08*   (2014.01)

(52) U.S. Cl.
CPC ..... *G01D 5/34707* (2013.01); *B23K 26/0823* (2013.01)

(58) Field of Classification Search
CPC .......... G01D 5/34707; G01D 5/34715; G01D 5/3473; G01D 5/347; G01D 5/34776; G01D 5/34784; G01D 5/34746; G01P 3/36; G01P 3/42; G01P 3/44; G01P 3/50; B23K 26/0823
See application file for complete search history.

(56) References Cited

U.S. PATENT DOCUMENTS

| | | | | |
|---|---|---|---|---|
| 4,416,534 A | * | 11/1983 | Kluger | G03G 15/50 399/396 |
| 6,118,132 A | * | 9/2000 | Tullis | G01B 11/16 250/208.1 |
| 7,076,195 B2 | * | 7/2006 | Sakai | H04N 1/0473 347/116 |

(Continued)

FOREIGN PATENT DOCUMENTS

| | | |
|---|---|---|
| JP | 2003284371 A | 10/2003 |
| JP | 2005345359 A | 12/2005 |

(Continued)

OTHER PUBLICATIONS

Office Action issued in JP Appln. No. 2014-001201 dated Oct. 3, 2017.

*Primary Examiner* — John Lee
(74) *Attorney, Agent, or Firm* — Rossi, Kimms & McDowell LLP

(57) ABSTRACT

A scale is configured to measure a displacement or velocity of a rotating object. The scale includes a first region that includes a first mark row including a plurality of marks arranged in a first period, and a second region that includes a second mark row including a plurality of marks arranged in a second period having a phase continuity with the first mark row formed in the first region. A periodic mark row including the first mark row and the second mark row is formed over an entire circumference of the rotating object including the first region and the second region.

12 Claims, 15 Drawing Sheets

(56) References Cited

U.S. PATENT DOCUMENTS

| | | | | |
|---|---|---|---|---|
| 7,606,514 | B2* | 10/2009 | Sakai | G03G 15/0131 198/810.03 |
| 7,810,901 | B2* | 10/2010 | Akiyama | B41J 19/202 347/37 |
| 8,090,281 | B2* | 1/2012 | Hirota | G03G 15/0131 399/49 |
| 9,164,458 | B2* | 10/2015 | Muroi | G03G 15/5041 |
| 9,207,252 | B2* | 12/2015 | Hamada | B65G 43/00 |
| 2004/0141775 | A1* | 7/2004 | Sakai | H04N 1/0473 399/297 |
| 2006/0268043 | A1* | 11/2006 | Akiyama | B41J 19/202 347/19 |
| 2006/0280523 | A1* | 12/2006 | Sakai | G03G 15/0131 399/167 |
| 2008/0099666 | A1* | 5/2008 | Masada | G01D 5/34707 250/226 |
| 2008/0218771 | A1* | 9/2008 | Murayama | B41J 11/007 356/614 |
| 2009/0316155 | A1* | 12/2009 | Yaku | G01D 5/34707 356/445 |
| 2010/0270461 | A1* | 10/2010 | Tominaga | G01D 5/347 250/231.1 |
| 2011/0049341 | A1* | 3/2011 | Nakajima | G01D 5/347 250/231.1 |
| 2011/0218760 | A1* | 9/2011 | Takahama | G01P 3/64 702/150 |
| 2011/0222882 | A1* | 9/2011 | Sugiyama | G03G 15/0131 399/49 |
| 2012/0124849 | A1* | 5/2012 | Hiller | G01D 5/248 33/1 PT |
| 2012/0315056 | A1* | 12/2012 | Muroi | G01N 21/4738 399/49 |
| 2013/0056624 | A1* | 3/2013 | Kato | G01D 5/347 250/231.1 |
| 2014/0021341 | A1* | 1/2014 | Nagae | G01D 5/347 250/231.1 |
| 2014/0022562 | A1* | 1/2014 | Corsico Piccolino | G01D 5/347 356/616 |
| 2014/0144757 | A1* | 5/2014 | Hamada | G01P 3/68 198/804 |
| 2014/0339404 | A1* | 11/2014 | Kimura | G01D 5/24438 250/231.1 |
| 2015/0192434 | A1* | 7/2015 | Fukuhara | B23K 26/0823 250/231.13 |
| 2015/0239002 | A1* | 8/2015 | Ardron | B41J 3/407 156/378 |
| 2015/0241795 | A1* | 8/2015 | Dekkers | G03F 7/70516 355/72 |
| 2015/0346000 | A1* | 12/2015 | Kato | G01D 5/24438 250/231.1 |
| 2017/0160105 | A1* | 6/2017 | Yen | G01D 5/3473 |

FOREIGN PATENT DOCUMENTS

| | | |
|---|---|---|
| JP | 2006160512 A | 6/2006 |
| JP | 2012247340 A | 12/2012 |

* cited by examiner

SCALE, MEASURING APPARATUS, IMAGE FORMATION APPARATUS, SCALE FABRICATING UNIT, AND SCALE FABRICATION METHOD

BACKGROUND OF THE INVENTION

Field of the Invention

The present invention relates to a scale formed on a surface of a rotating object and used to detect a displacement or velocity.

Description of the Related Art

In a conventional method of detecting a displacement or velocity of a rotating object, a scale formed on a surface of the rotating object is used. Methods of forming the scale on the surface of the rotating object include a method of directly forming the scale on the surface of the rotating object using a laser marker. However, the formation of the scale on the surface of the rotating object involves matching, to an desired interval, an interval between a mark formed first and a mark formed last on the surface of the rotating object at a joint portion therebetween, which causes difficulties. Since the periodicity of marks is lost at such a joint portion of the scale, the displacement or velocity of the rotating object cannot be correctly detected, and the rotating object cannot be provided with a drive control at high accuracy.

Japanese Patent Laid-open No. 2005-345359 discloses a displacement measuring apparatus that controls the rotating object to be in a desired drive state by using a dummy control signal at the joint portion.

In the displacement measuring apparatus disclosed in Japanese Patent Laid-open No. 2005-345359, the dummy signal is used at the joint portion of the scale instead of a detection signal. Thus, with the configuration disclosed in Japanese Patent Laid-open No. 2005-345359, the displacement or velocity of the rotating object cannot be correctly detected at the joint portion of the scale, and the rotating object cannot be provided with a drive control at high accuracy.

SUMMARY OF THE INVENTION

The present invention provides a scale, a measuring apparatus, an image formation apparatus, a scale fabricating unit, and a scale fabrication method that can highly accurately detect a displacement or velocity of a rotating object by reducing influence of a joint portion.

A scale as one aspect of the present invention is a scale for measuring a displacement or velocity of a rotating object and includes a first region that includes a first mark row including a plurality of marks arranged in a first period, and a second region that includes a second mark row including a plurality of marks arranged in a second period having a phase continuity with the first mark row formed in the first region, a periodic mark row being formed that included the first mark row and the second mark row over an entire circumference of the rotating object including the first region and the second region.

A measuring apparatus as another aspect of the present invention includes a rotating object, a scale formed on a surface of the rotating object, a sensor configured to detect a mark row formed on the scale, and a measurement unit configured to measure a relative displacement or relative velocity between the rotating object and the sensor, the scale including a first region that includes a first mark row including a plurality of marks arranged in at first period, and, a second region that includes a second mark row including a plurality of marks arranged in a second period having a phase continuity with the first mark row formed in the first region, and a periodic mark row being formed that includes the first mark row and the second mark row over an entire circumference of the rotating object including the first region and the second region.

An image formation apparatus as another aspect of the present invention includes the measuring apparatus.

A scale fabricating unit as another aspect of the present invention includes a driver configured to drive a rotating object, a mark formation unit configured to form a periodic mark row on the rotating object, a detection unit configured to detect, at a detection position distant by a first distance from a fabrication position at which the mark formation unit forms the mark row, a mark formed first in a first mark row including a plurality of marks arranged in a first period in a first region of the rotating object, and a control unit configured to calculate a length of a second region of the rotating object based on a phase state of one mark in the first mark row when the mark formed first is detected and a distance between the fabrication position and the detection position.

A scale fabrication method as another aspect of the present invention includes the steps of driving a rotating object; forming a periodic mark row on the rotating object using a mark formation unit; detecting, at a detection position distant by a first distance from a fabrication position at which the mark formation unit forms the mark row, a mark formed first in a first mark row including a plurality of marks arranged in a first period in a first region of the rotating object; and calculating a length of a second region of the rotating object based on a phase state of one mark in the first mark row when the mark formed first is detected and a distance between the fabrication position and the detection position.

Further features and aspects of the present invention will become apparent from the following description of exemplary embodiments with reference to the attached drawings.

DESCRIPTION OF THE EMBODIMENTS

Figure 1:
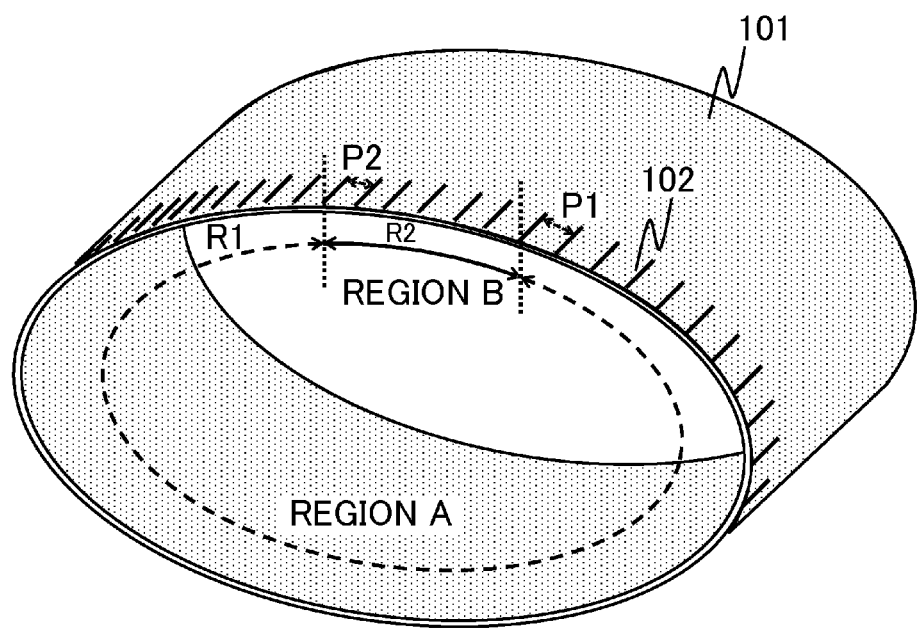
FIG. 1 is a configuration diagram of a seamless scale in Embodiment 1.

Exemplary embodiments of the present invention will be described below with reference to the accompanied drawings. In each of the drawings, the same elements will be denoted by the same reference numerals and the duplicate descriptions thereof will be omitted.

Embodiment 1

First, referring to FIG. 1, a scale in Embodiment 1 of the present invention will be described. FIG. 1 is a configuration diagram of a seamless scale 102 (the scale) in the present embodiment.

The seamless scale 102 is formed on a surface of a rotating object 101, which has a total length of R (=R1+R2), and is used to measure a displacement or velocity of the rotating object 101. The seamless scale 102 is provided with a plurality of marks formed in a predetermined period on the surface of the rotating object 101. The seamless scale 102 includes a region A (first region) having a length R1 and a region B (second region) having a length R2. The region A is a region in which a first mark row including a plurality of marks arranged in a first period P1 is formed. The region B is a region in which a second mark row including a plurality of marks arranged in a second period P2 is formed. Thus, the seamless scale 102 is a scale in which a periodic mark row including the first mark row and the second mark row is formed over an entire circumference of the rotating object 101 including the first region and the second region. In the second region, the second mark row is formed in the second period having a phase continuity with (i.e. having a phase aligned with) the first mark row formed in the first region. Thus, the seamless scale 102 of the present embodiment is a scale whose joint portion has reduced influence (preferably, no influence) that decreases a signal amplitude. Having the phase continuity means that the second period, which is the period of the mark row formed in the second region, has a small difference from the first period in the first region (difference of not greater than 10% of the first period, and more preferably not greater than 5% thereof). This prevents an abrupt (step-like) change of the phase across a boundary between the first region and the second region, which leads to an improved detection accuracy of the phase, and hence improved detection accuracies of the displacement and the velocity. This second period may change gradually in the second region. For example, the second period may have a small difference from the first period near the boundary between the first region and the second region, and may have a large difference from the first period away from the first region (near a middle of the second region, for example). The second period having the largest difference from the first period is preferably not greater than 10% of the first period, and more preferably not greater than 5% (3%).

Figure 2:
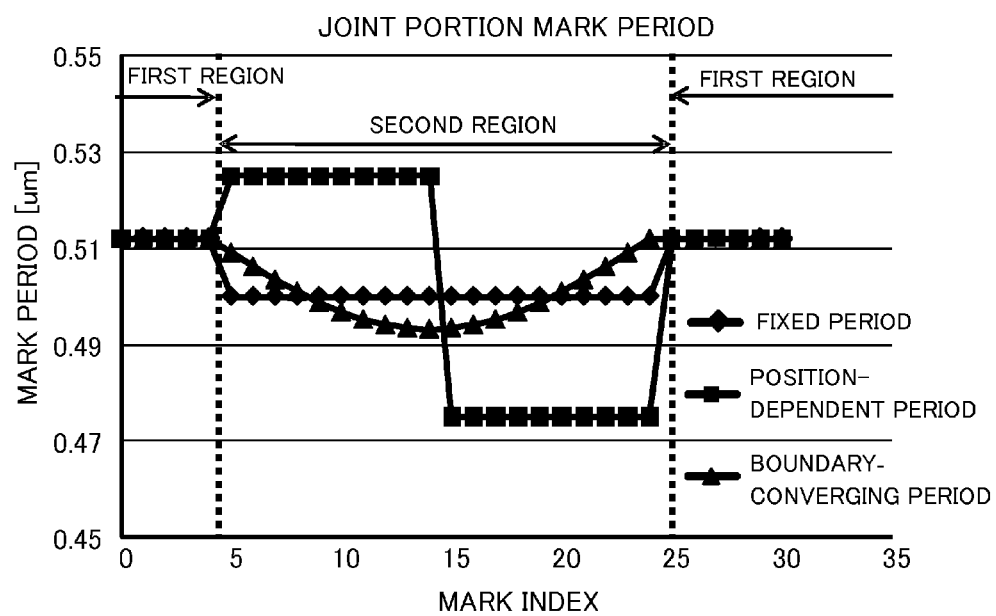
FIG. 2 illustrates a period of marks at a joint portion of the seamless scale in Embodiment 1.

Next, referring to FIG. 2, a mark period in the first region (region A) and the second region (region B) of the seamless scale 102 will be described. FIG. 2 illustrates the mark period at the joint portion of the seamless scale 102.

First, a case in which the second mark row is formed with a fixed period, that is, a constant period (the second period P2) in the second region will be described. In the first region, the marks are periodically formed in the first period P1 set by a user. On the other hand, in the second region, the second period P2 is set so that a leading mark formed in the first region and a last mark formed in the second region are formed in the second period P2. Specifically, the second period P2 of the marks formed in the second region is set such that its relation with the first period P1 of the marks formed in the first region satisfies Expression (1) below.

$$P2 = P1 + \frac{R2 - \mathrm{round}\left(\frac{R2}{P1}\right) * P1}{\mathrm{round}\left(\frac{R2}{P1}\right)} \tag{1}$$

In Expression (1), round(a) represents a round function that rounds a value of "a" to an integer. The function yields a closest integer value as shown in, for example, round(4.3)=4 for R2/P1=4.3 and round(4.8)=5 for R2/P1=4.8. The right hand side of Expression (1) is a value resulted from addition of, to the first period P1, a value obtained by dividing an excess length that would cause a mismatch between mark intervals at the joint portion, which is the numerator of the second term on the right hand side, by the number N of scales formed in the second region, which is the denominator. This will be described in detail with reference to FIG. 2.

FIG. 2 illustrates a period of marks formed on the surface of the rotating object 101 over a range from the first region through the second region to the first region. When the first period P1 is 0.512 mm and the length R2 of the second region is 10 mm, the number of marks formed in the second region is 20. Thus, Expression (1) calculates the second period P2 to be 0.5 mm. The period of marks formed with these parameters has a mark period profile having a fixed period as illustrated in FIG. 2. The marks formed in the second period P2 in the second region allow the leading mark and the last mark to be joined at the joint portion with a mark interval therebetween being the second period P2.

Next, a case where the second period P2 in the second region changes (differs) depending on a position in the second region will be described. In the second region, marks are formed in optional periods whose average value is set to be the second period P2 calculated by Expression (1). That is, the average value of the second period P2 is equal to the value of the second period P2 when the second period P2 is assumed to be constant.

For example, 10 marks are formed such that a period thereof is 0.525 μm, which is longer than the second period P2 calculated by Expression (1) by 5%. The remaining 10 marks are formed such that a period thereof is 0.475 μm, which is shorter than the second period P2 calculated by Expression (1) by 5%. The period of the marks thus formed has a mark period profile with a position-dependent period illustrated in FIG. 2. As described above, forming such a position-dependent mark row allows a mark row having a predetermined period error with respect to the first period P1 to be formed on the seamless scale 102. Such a period error pattern portion formed on the seamless scale 102 on the surface of the rotating object 101 functions to cause a signal amplitude decrease that is to be detected by a sensor 302 described later while keeping the signal amplitude decrease to a predetermined range. For example, the second region serves as such a portion and is used as a rotational origin position of the rotating object 101.

Next, a case of forming, in the second region, a mark row in the second period P2 that converges to the first period P1 at its boundary with the first region will be described. The convergence means that the second period P2 is closer to the first period P1 at a position closer to the boundary between the first region and the second region.

In the second region, a mark row that continuously changes with a position is formed in a mark period that changes slowly near the joint portion between the regions. Specifically, the period of the mark row is determined at each position by using an appropriate polynomial function so that a cumulative length of the mark row in the second region is the same as those given by the two mark forming methods described above. The mark row thus formed has, for example, a mark period profile with a boundary-converging period in FIG. 2. This enables formation of a seamless scale in which the mark period changes slowly and continuously near the boundary. Thus, a signal amplitude can change slowly near the boundary even when only one photodiode constitutes a photodiode array in a photodetector on the sensor 302 as described later.

In the present embodiment, the first region and the second region are defined, and in the second region, the second mark row is defined and marks are formed. Thus, it is possible to form periodic marks having no joint portion (or a small joint portion) in the phase of a period of the marks over the entire circumference of the rotating object 101.

Figure 3A:
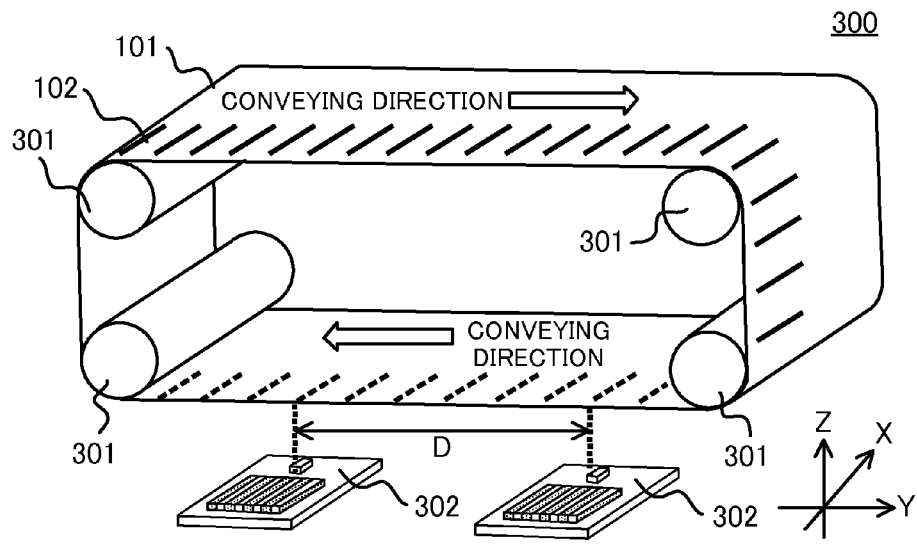
FIGS. 3A and 3B are configuration diagrams of a measuring apparatus including the seamless scale in Embodiment 1.
Figure 3B:
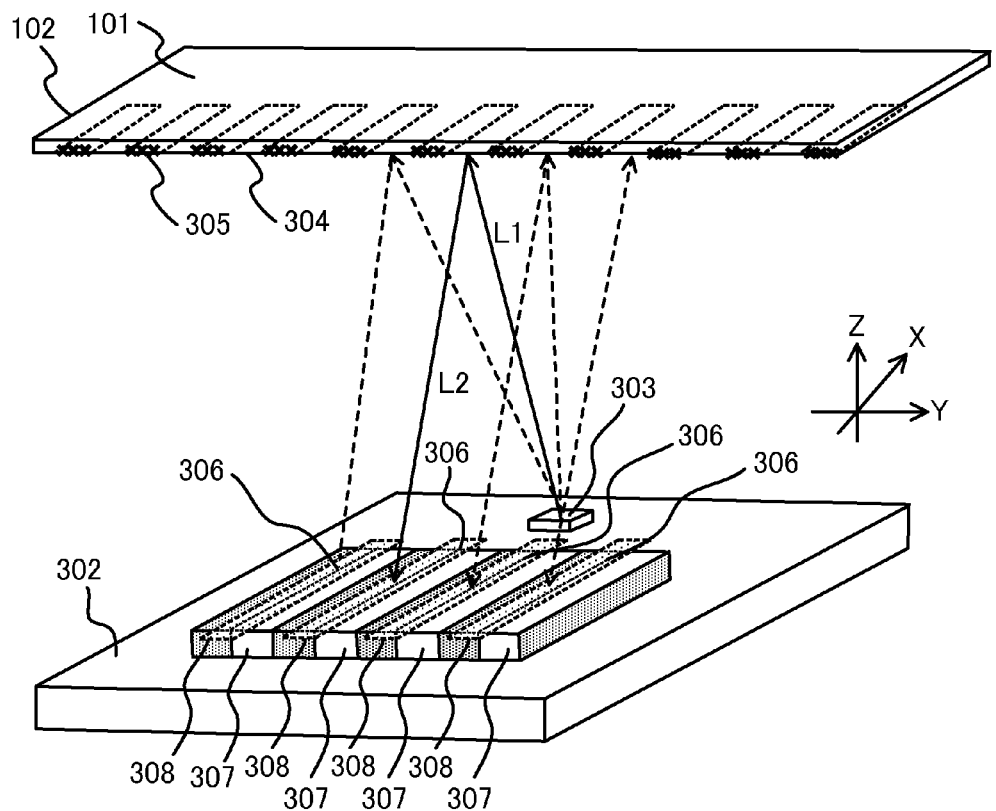

Next, referring to FIGS. 3A and 3B, a measuring apparatus (displacement measuring apparatus or velocity measuring apparatus) in the present embodiment will be described. FIGS. 3A and 3B are configuration diagrams of a measuring apparatus 300. Although the present embodiment describes a case of employing an optical sensor, the present invention is not limited thereto, and a magnetic sensor is applicable instead. First, referring to FIG. 3A, a schematic configuration of the measuring apparatus 300 will be described. The measuring apparatus 300 includes two sensors 302 disposed separately from each other by a predetermined distance D and facing the seamless scale 102 formed on the surface of the rotating object 101 put around rollers 301. The surface of the rotating object 101 can be displaced relative to the sensors 302 in a Y axis direction illustrated in FIG. 3A. With this configuration, the sensors 302 can detect a mark row formed on the seamless scale 102.

Next, referring to FIG. 3B, a positional relation between the sensors 302 and the seamless scale 102 will be described. FIG. 3B is an enlarged view of a vicinity of each sensor 302 in FIG. 3A. The seamless scale 102 formed on the surface of the rotating object 101 is illuminated with a divergent light beam emitted from a light source 303 mounted on the sensor 302. The seamless scale 102 has a regular reflective portion 304 and a scattering portion 305 that are periodically formed on the surface thereof, the scattering portion 305 (illustrated with a broken line) having a regularly reflected light intensity relatively lower than that of the regular reflective portion 304. The light beam incident and reflected on the seamless scale 102 forms, on the photodetector of the sensor 302, a reflection pattern image 306 having a light intensity distribution dependent on a regular reflectance of the seamless scale 102. The reflection pattern image 306 is displaced along with displacement of the surface of the rotating object 101. A relation between the displacement of the reflection pattern image 306 and the displacement of the surface of the rotating object 101 is represented by Expression (2) below.

$$X2 = \frac{L1+L2}{L1} \times X1 \quad (2)$$

In Expression (2), L1 represents an optical path length from the light source 303 to a reflection position on the seamless scale 102, and L2 represents an optical path length from this reflection position to an incident position on the photodetector of the sensors 302. In addition, X1 represents the displacement of the surface of the rotating object 101, and X2 represents the displacement of the corresponding reflection pattern image 306.

Next, the photodetector of the sensors 302 will be described. The photodetector includes a plurality of photodiodes each including a pair of photodiode arrays 307 and 308 that are arranged alternately and periodically. When a mark period in the first region of the seamless scale 102 is the first period P1, the photodiode array 307 having a width d is periodically arranged in a period of $(L1+L2)/L1 \times P1$ in the Y axis direction. The photodiode array 308 having the same configuration is periodically arranged at positions shifted in the Y axis direction by a half of the arrangement period of the photodiode array 307, which is $(L1+L2)/2/L1 \times P1$.

Figure 4A:
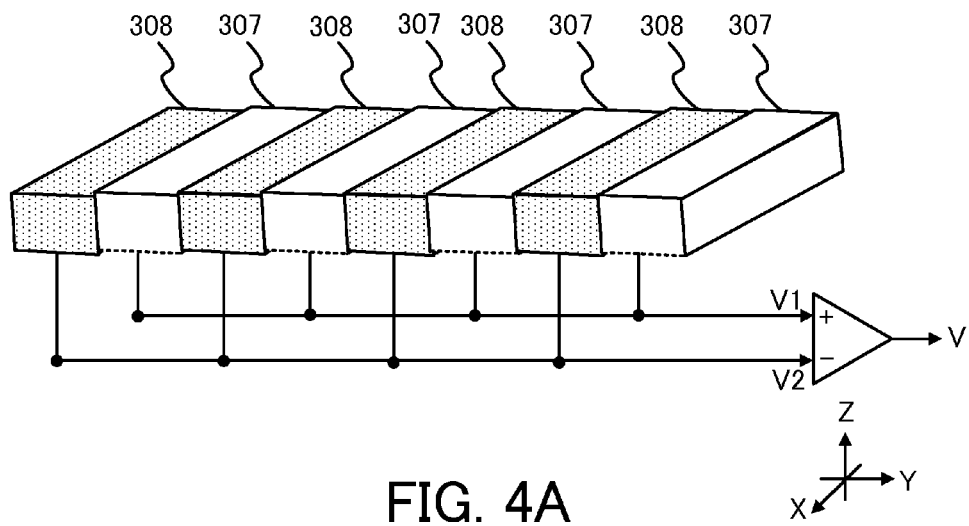
FIGS. 4A to 4C are explanatory diagrams of a method of detecting a surface displacement of a rotating object by using the measuring apparatus (a displacement measuring apparatus) including the seamless scale in Embodiment 1.
Figure 4B:
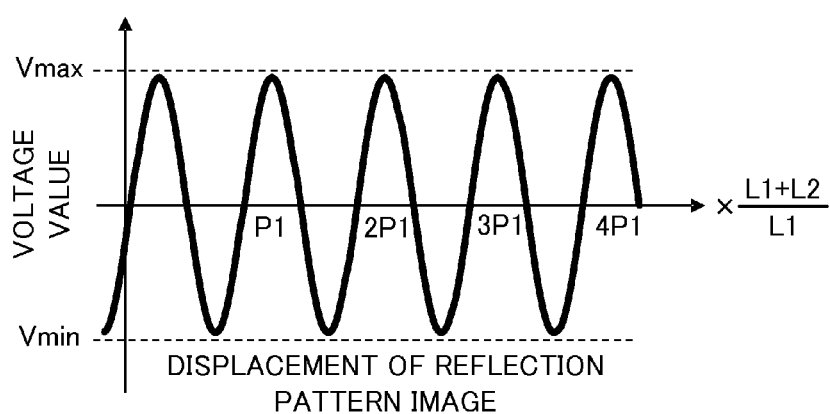
Figure 4C:
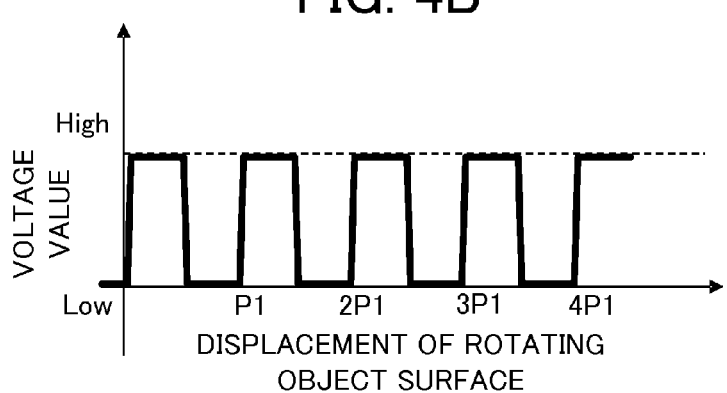

Next, referring to FIGS. 4A to 4C, a generation mechanism of a pulse signal generated by the sensor 302 along with the displacement of the surface of the rotating object 101 will be described. FIGS. 4A to 4C are explanatory diagrams of a method of detecting the displacement of the surface of the rotating object 101 by using the measuring apparatus 300 (displacement measuring apparatus) including the seamless scale 102.

First, referring to FIG. 4A, voltage values detected by the photodiode arrays 307 and 308 will be described. The reflection pattern image 306 formed on the photodiode arrays 307 and 308 is provided with a photoelectric conversion through the photodiode arrays 307 and 308. In other words, each photodiode performs a voltage conversion by the photoelectric conversion. Then, detected voltage values of the photodiodes included in the photodiode array 307 are summed to give a detected voltage value V1 of the photodiode array 307. Similarly, detected voltage values of the photodiodes included in the photodiode array 308 are summed to give a detected voltage value V2 of the photodiode array 308. Then, the sensor 302 calculates a differential voltage value between the voltage values of the photodiode arrays 307 and 308, based on which a detected voltage value at a time on which an intensity distribution of the reflection pattern image 306 in the Y axis direction is reflected is obtained and output.

In this manner, in the present embodiment, the mark row has such a configuration that a light reflectance or transmittance is periodically changed. The photodetector included in the sensor 302 is configured to detect a reflected light or a transmitted light from the seamless scale 102. The photodetector of the sensor 302 includes a plurality of light receiving elements (the photodiode arrays 307 and 308), and adds signals output from the light receiving elements to output a resulting signal as a detection signal (detected voltage value). The detected voltage value output from the sensor 302 is represented by Expression (3) below.

$$V = V1 - V2 \quad (3)$$

Next, referring to FIG. 4B, a signal change detected along with the displacement of the surface of the rotating object 101 will be described. FIG. 4B illustrates a relation between the displacement of the reflection pattern image 306 caused by the displacement of the surface of the rotating object 101 and a detected voltage value V detected by the photodiode arrays. The displacement of the surface of the rotating object 101 displaces the reflection pattern image 306 on the photodiode arrays.

When a center of the photodiodes included in the photodiode array 307 coincides with a center of the reflection pattern image 306, the detected voltage value V1 of the photodiode array 307 is at its maximum value. In contrast, the detected voltage value V2 of the photodiode array 308 spatially shifted from the photodiode array 307 by (L1+L2)/2/L1×P1 is at its minimum value, and hence the detected voltage value V is at its maximum value Vmax. When the center of the reflection pattern image 306 is moved to a center of the photodiodes included in the photodiode array 308 along with the displacement of the surface of the rotating object 101, the detected voltage value V1 of the photodiode array 307 is at its minimum. In contrast, the detected voltage value V2 of the photodiode array 308 is at its maximum, and hence the detected voltage value V is at its minimum value Vmin.

As described above, the detected voltage value V detected by the photodiode arrays alternates between the maximum value Vmax and the minimum value Vmin for each displacement (L1+L2)/2/L1×P1 of the reflection pattern image 306, thereby generating a sinusoidal signal. As illustrated in FIG. 4A, the detection of the signal involves accumulation of outputs from a plurality of photodiodes. Thus, any reflection of a reverse reflection pattern onto the photodiode arrays when the joint portion of the seamless scale 102 passes decreases the signal amplitude. However, the seamless scale 102 in the present embodiment has the phase continuity, and thus no significant amplitude change except for a slight amplitude change due to a change of a mark period is generated, which enables signal detection over the entire circumference of the rotating object 101.

A change amount of the signal amplitude for the change of the mark period depends on a total number of photodiodes included in the photodiode arrays. Thus, this signal amplitude dependency of the sensor 302 on the change of the mark period and a desired maximum change amount ratio of a mark period in the second mark row to the first period P1 are preferably reflected on determination of the length R2 of the second region. For example, when the second mark row is set to be a fixed mark period (the second period P2), the length R2 of the second region is given by R2=(n±0.5)×P1 (n is a natural number) for a maximum mark period ratio P2/P1. In this example, P1 and P2 have the ratio P2/P1=(n±0.5)/n. It is preferably that the natural number n is determined so that the ratio P2/P1 is within a signal amplitude allowable value range based on the signal amplitude dependency on the change of the mark period, and the length R2 to be previously set is determined.

Next, referring to FIG. 4C, the pulse signal output from the sensor 302 based on the detected voltage value V detected along with the displacement of the surface of the rotating object 101 will be described. FIG. 4C illustrates the pulse signal output from the sensor 302 based on the detected voltage value V of the photodiode arrays. The sensor 302 compares the detected voltage value V thus obtained against a center voltage value Vc given by Expression (4) below and outputs a high level pulse signal for V>Vc and a low level pulse signal for V<Vc.

$$Vc = \frac{V\max + V\min}{2} \quad (4)$$

The displacement of the reflection pattern image 306 along with a displacement for one mark period (the first period P1) in the first region on the seamless scale 102 on the surface of the rotating object 101 is given by (L1+L2)/L1× P1. This displacement is equal to the arrangement period of the photodiode arrays. Thus, the detected voltage value V obtained through the displacement of the surface of the rotating object 101 by the first period P1 is generated as a one period sinusoidal signal having the center voltage value Vc, and then the sensor 302 outputs one period pulse. The displacement of the surface of the rotating object 101 can be calculated by counting the number of pulses thus output from the sensor 302 along with the displacement of the surface of the rotating object 101.

Figure 5:
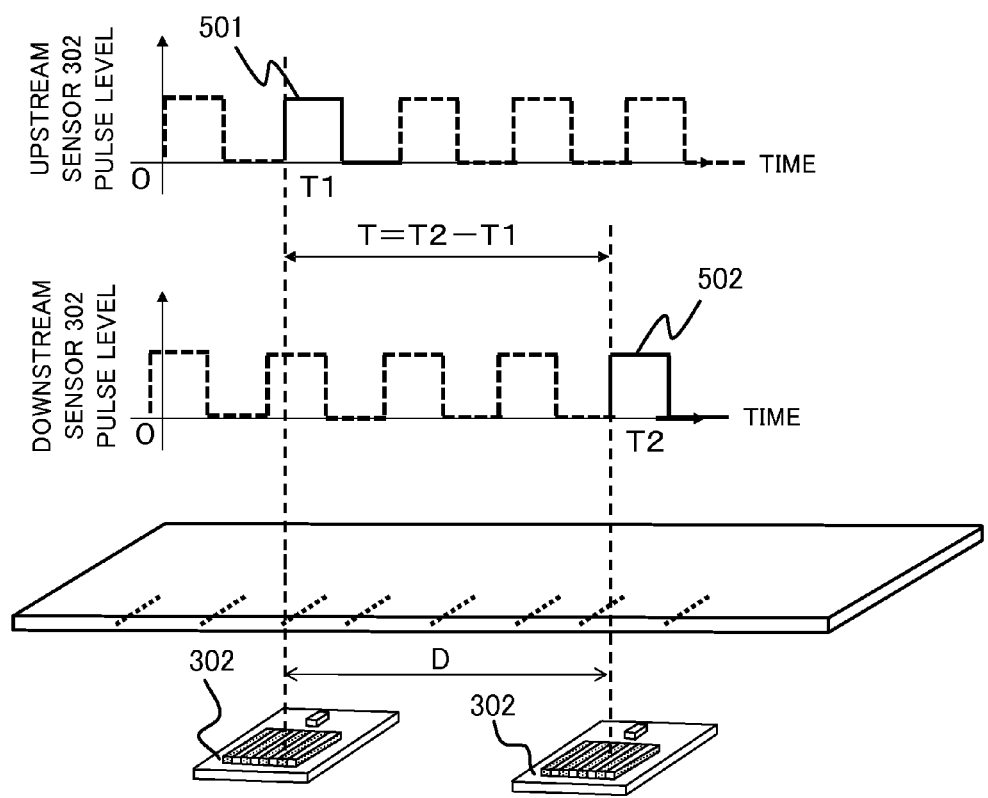
FIG. 5 illustrates a method of detecting a surface velocity of the rotating object by using the measuring apparatus (a velocity measuring apparatus) including the seamless scale in Embodiment 1.

Next, referring to FIG. 5, a method of detecting a velocity of the surface of the rotating object 101 will be described. FIG. 5 illustrates a method of detecting the velocity of the surface of the rotating object 101 by using the measuring apparatus 300 (velocity measuring apparatus) including the seamless scale 102. Below will be discussed a particular mark that is formed on the seamless scale 102 of the surface of the rotating object 101 and is moved together with the displacement of the surface of the rotating object 101.

The sensor 302 (a first sensor) located upstream in a direction of the displacement of the surface of the rotating object 101 detects this particular mark and outputs a detection pulse 501 at time T1. After this displacement of the surface of the rotating object 101, the sensor 302 (a second sensor) located downstream in the direction of the displacement of the surface of the rotating object 101 detects this particular mark (the same mark) and outputs a detection pulse 502 at time T2. Then, a time duration (particular mark detection time difference T2-T1) required by the particular mark to travel the distance between the two sensors 302 and this distance D between the two sensors that is the displacement of the particular mark are used to calculate a velocity V at which the particular mark on the surface of the rotating object 101 traveled the distance between the two sensors. The velocity V can be calculated by Expression (5) below.

$$V = \frac{D}{T2 - T1} \quad (5)$$

Applying such a velocity detection method to an optional mark enables the velocity to be detected from a mark period on the seamless scale 102. This velocity detection method does not depend on a formation accuracy of the mark period on the seamless scale 102. Thus, the velocity detection is possible even when the mark row in the second region is formed in a period (the second period P2) different from the predetermined period (the first period P1). Such a method enables the velocity detection of the surface of the rotating object 101 over the entire circumference of the surface of the rotating object 101.

Figure 6:
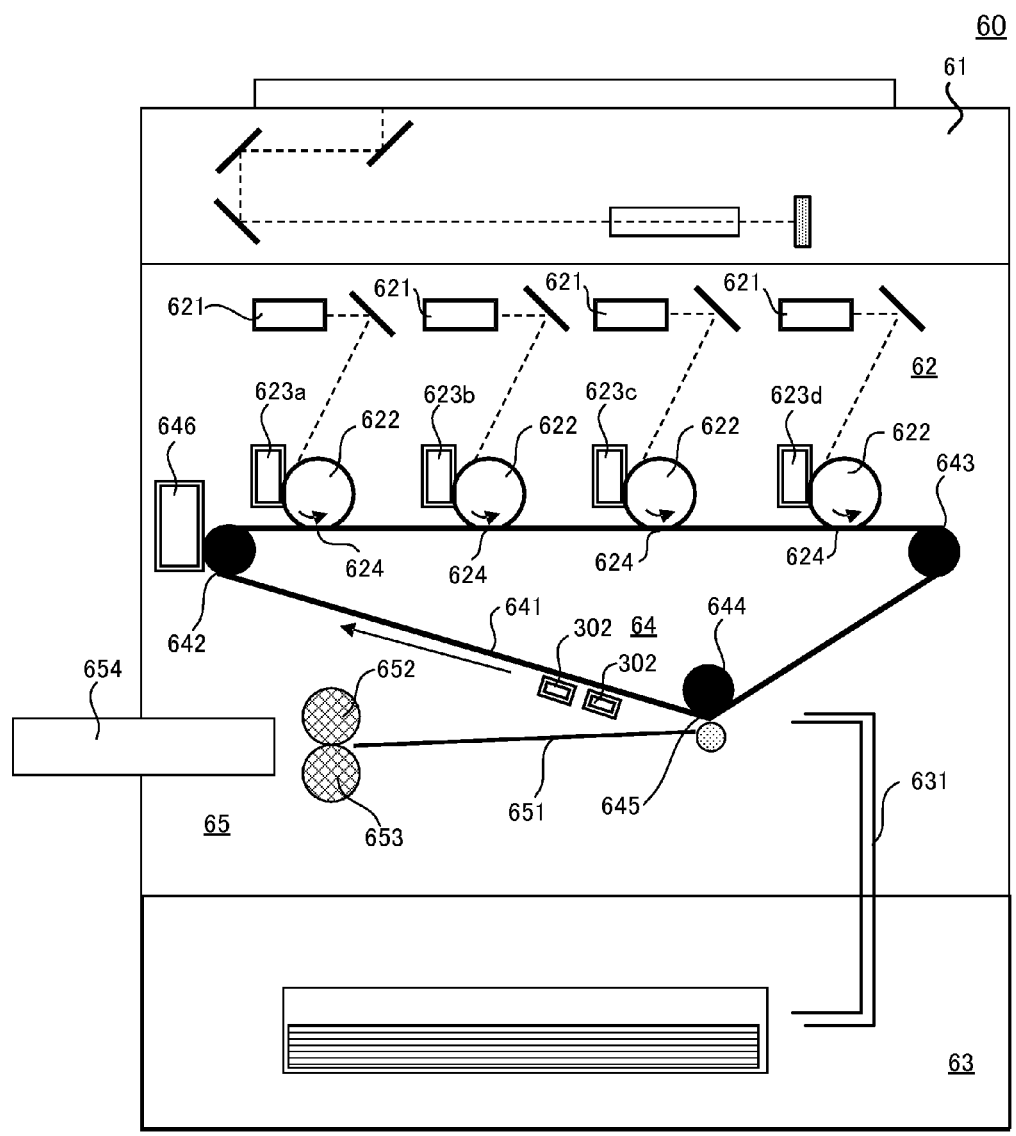
FIG. 6 is a configuration diagram of the image formation apparatus in Embodiment 1.
Figure 7:
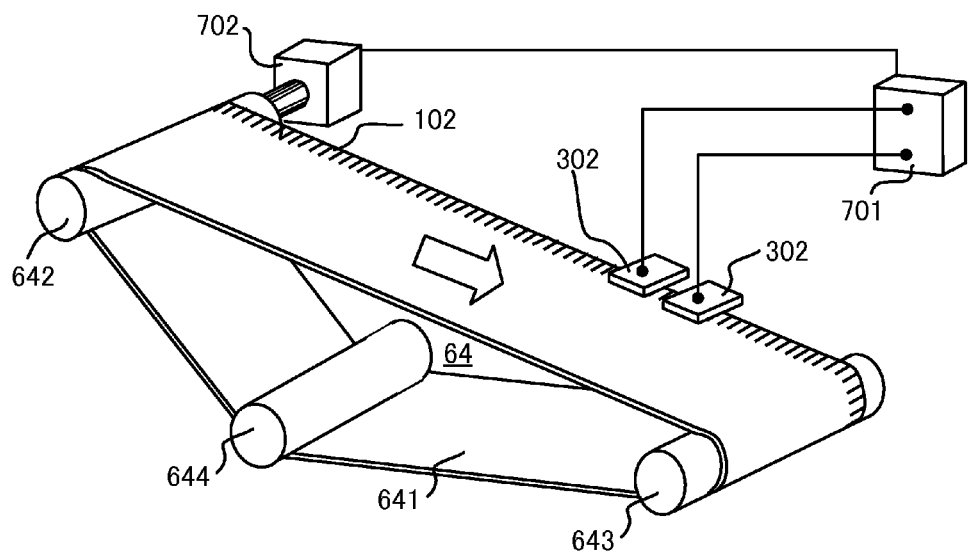
FIG. 7 is a configuration diagram of a sensor that detects a surface velocity of an intermediate transfer belt in the image formation apparatus in Embodiment 1.

Next, referring to FIGS. 6 and 7, an image formation apparatus performing a velocity measurement method using the seamless scale 102 in the present embodiment will be described. First, referring to FIG. 6, a configuration of the image formation apparatus in the present embodiment will be described. FIG. 6 is a configuration diagram of this image formation apparatus 60. The image formation apparatus 60 includes a reader unit 61 that reads a document image, an image forming unit 62, a feeding unit 63, an intermediate transfer unit 64, and a fixing unit 65.

Optical units 621 included in the image forming unit 62 irradiate, depending on image data read by the reader unit 61, corresponding photoreceptor drums 622 with modulated laser beams to form electrostatic latent images. The photoreceptor drums 622 are rotated at constant velocities in directions of arrows in FIG. 6. Development units 623a, 623b, 623c, and 623d respectively house developers (toners) in four colors of yellow, cyan, magenta, and black, and develop the electrostatic latent images of the photoreceptor drums 622 with the toners. Toner images on the photoreceptor drums 622 are transferred onto a surface of an intermediate transfer belt 641 at its primary transfer regions 624.

In the intermediate transfer unit 64, the intermediate transfer belt 641 (rotating object 101) is put around a drive roller 642, a steering roller 643, and a secondary transfer roller 644. The drive roller 642 is connected to a motor (not illustrated), and rotation of the motor conveys the intermediate transfer belt 641 in a direction of an arrow illustrated in FIG. 6. When the intermediate transfer belt 641 is moved to aside in a direction (vertical direction) vertical to a conveying direction while being conveyed, the steering roller 643 tilts the belt toward this vertical direction so as to move the belt back to its original position in the vertical direction.

The intermediate transfer belt 641 is made of polyimide and has the seamless scale 102 formed on its edge. The two sensors 302 are disposed facing the seamless scale 102. The photoreceptor drums 622 and the intermediate transfer belt 641 are controlled to have a constant velocity in the primary transfer regions 624 through a drive control. This drive control method will be described later. The toner images thus transferred on the intermediate transfer belt 641 are transferred, at a secondary transfer region 645, on a sheet supplied from the feeding unit 63 through a conveyance guide 631. Any toner remaining on a surface of the intermediate transfer belt 641 is cleaned by a cleaning unit 646.

The fixing unit 65 fixes the toner images on the sheet conveyed from the secondary transfer region 645 through a conveyance guide 651. Specifically, a fixing roller 652 including a heat source, and a pressing roller 653 that presses the sheet against the fixing roller 652 provide the sheet with fixing processing. The sheet provided with the fixing processing is output to an output tray 654.

Next, referring to FIG. 7, the drive control method of the intermediate transfer belt 641 will be described. FIG. 7 is a configuration diagram of a sensor that detects a surface velocity of the intermediate transfer belt 641. The two sensors 302 separated by a predetermined distance D are attached facing the seamless scale 102 formed on the surface of the intermediate transfer belt 641. A motor rotation controller 701 (measurement unit) estimates a relative displacement or relative velocity between the intermediate transfer belt 641 (rotating object 101) and the sensors 302. More specifically, the motor rotation controller 701 calculates the surface velocity of the intermediate transfer belt 641 based on displacement pulse signals detected by the sensors 302. The motor rotation controller 701 outputs a rotation instruction signal based on the surface velocity thus obtained of the intermediate transfer belt 641 to a driving motor 702. The driving motor 702 rotates such that the surface velocity of the intermediate transfer belt 641 has a desired constant velocity. Although the two sensors 302 (first and second sensors) in FIG. 7 are arranged differently from the arrangement in FIG. 5, the sensors 302 are not limited to this arrangement and may be arranged at any positions.

As described above, in the present embodiment, the seamless scale 102 formed on the surface of the intermediate transfer belt 641 constantly allows accurate detection and control of the surface velocity of the intermediate transfer belt 641. This can provide an image formation apparatus capable of reducing relative color shift of each toner transferred onto the surface over an entire circumference of the intermediate transfer belt 641 so as to form a high quality image.

Embodiment 2

Next, a fabricating unit (manufacturing unit) and a method of fabricating (manufacturing) the seamless scale 102 in Embodiment 2 of the present invention will be described.

Figure 8:
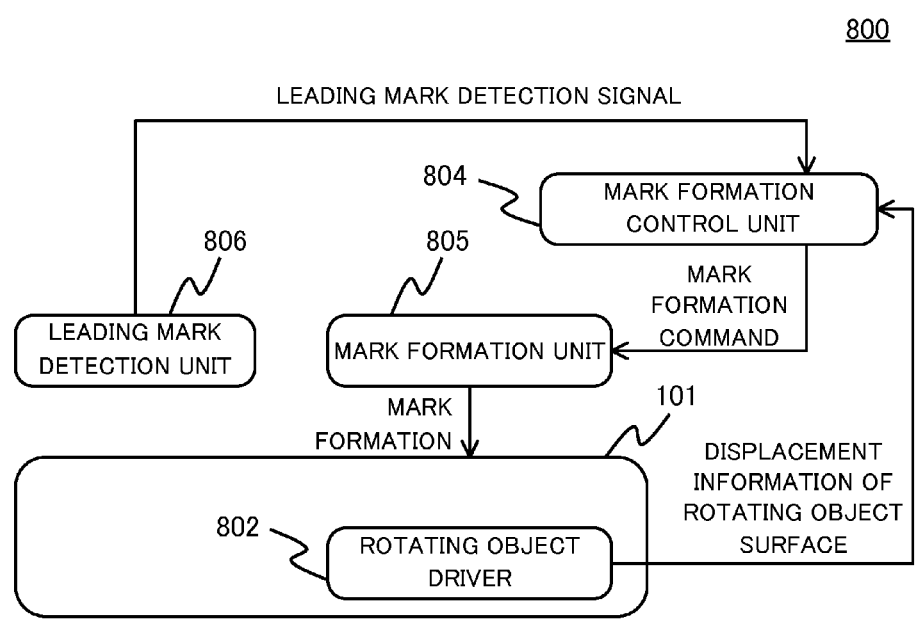
FIG. 8 is a configuration diagram of a fabricating unit for a seamless scale in Embodiment 2.

FIG. 8 is a configuration diagram of a fabricating unit 800 for the seamless scale. In FIG. 8, a mark formation control unit 804 (control unit) calculates information of the displacement of the surface of the rotating object 101 (rotating object surface displacement information) at a mark formation position based on rotational amount information (rotational amount information of the rotating object 101) from a rotating object driver 802 (drive unit). The mark formation control unit 804 outputs, in accordance with the displacement of the surface of the rotating object 101, a mark formation command to a mark formation unit 805 to form a periodic mark row in the first period P1 in the first region on the surface of the rotating object 101.

A leading mark detection unit 806 (detection unit) detects a center of a mark (leading mark) fabricated first by the rotating object driver 802. Specifically, the leading mark detection unit 806 detects, at a detection position distant by a first distance from a fabrication position at which the mark formation unit 805 forms the mark row, the mark (leading mark) formed first in the first mark row formed in the first period P1 in the first region of the rotating object 101. Upon detecting the leading mark, the leading mark detection unit 806 outputs a leading mark detection signal to the mark formation control unit 804. Upon receiving the leading mark detection signal, the mark formation control unit 804 outputs a mark formation command to the mark formation unit 805 to form marks in the second period P2 in the second region as an unfabricated region on the surface of the rotating object 101.

Figure 9A:
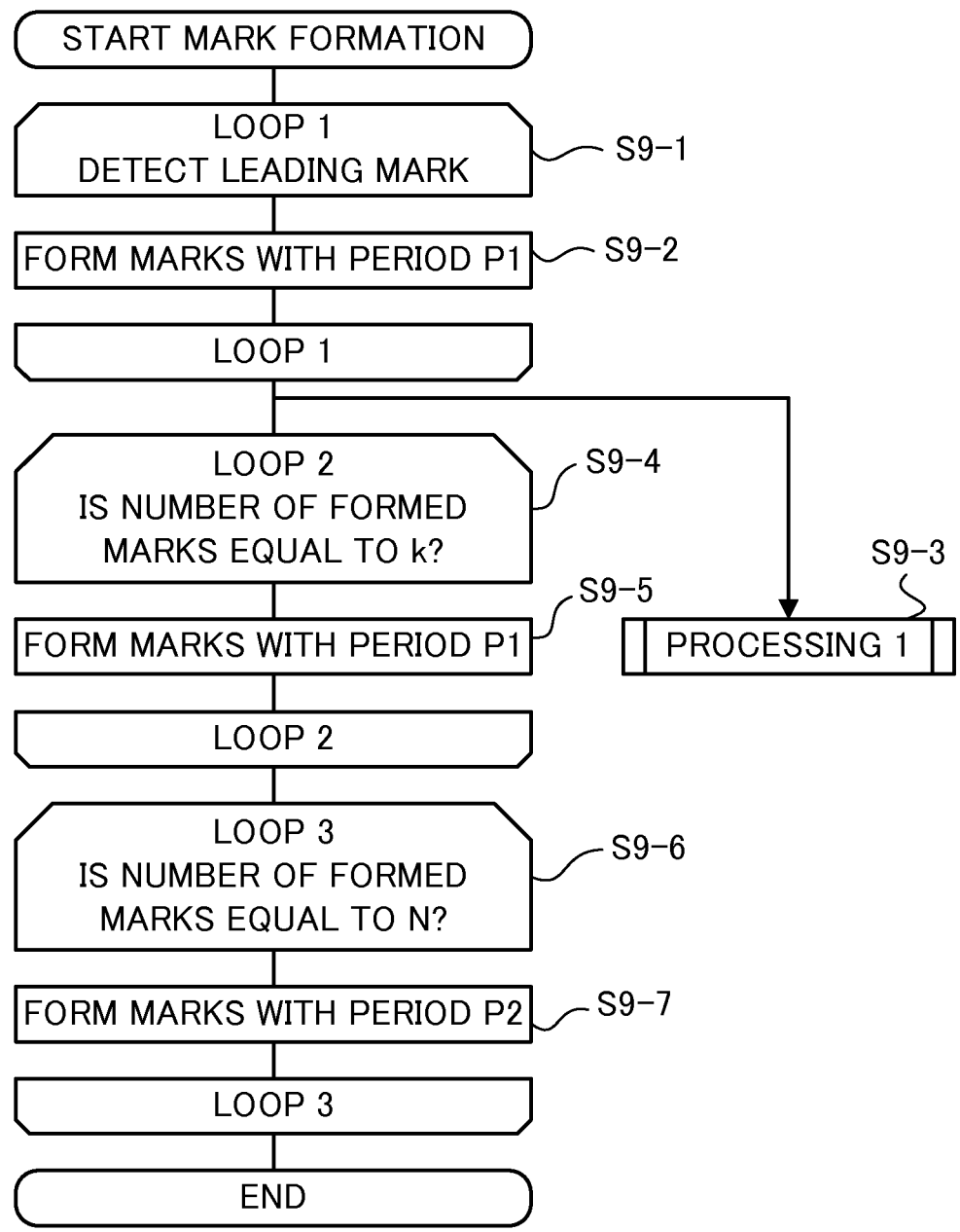
FIGS. 9A and 9B are flowcharts illustrating a method of fabricating a seamless scale in Embodiment 2.
Figure 9B:
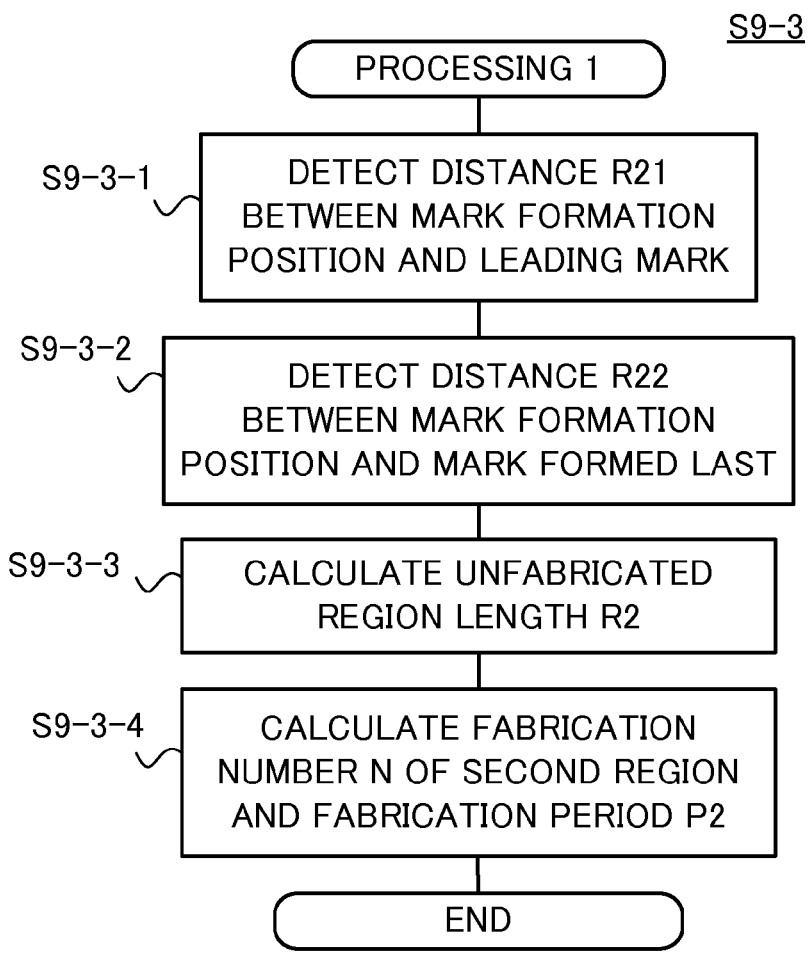

FIGS. 9A and 9B are flowcharts of the method of fabricating the seamless scale in the present embodiment and illustrate a flow of forming a predetermined mark row on the surface of the rotating object 101. Steps in FIGS. 9A and 9B are performed mainly based on a command from the mark formation control unit 804.

First, referring to FIG. 9A, a mark forming process involving three loops will be described. The mark formation starts with forming a leading mark. Loop 1 is repeated until the leading mark detection unit 806 detects arrival of a center of the leading mark. As described above, in loop 1, the mark formation control unit 804 forms marks based on the displacement of the surface of the rotating object 101 so that a period of the marks is equal to the first period P1 (steps S9-1 and S9-2).

Next, the method of calculating the second period P2 of marks formed in the second region and the number N thereof, which was described referring to FIG. 1, will be described. When the leading mark detection unit 806 detects arrival of the leading mark, the mark formation control unit 804 performs loop 2 (step S9-4) and processing 1 (step S9-3).

First, loop 2 (step S9-4) will be described. The rotating object 101 keeps rotating while processing 1 (step S9-3) is performed to obtain mark formation conditions in the second region. With time needed for processing 1 (step S9-3) taken into account, the mark formation unit 805 forms k marks in the first period P1 after the leading mark detection unit 806 detects the leading mark (step S9-5). During this formation, the mark formation control unit 804 finishes processing 1 (step S9-4).

Figure 10:
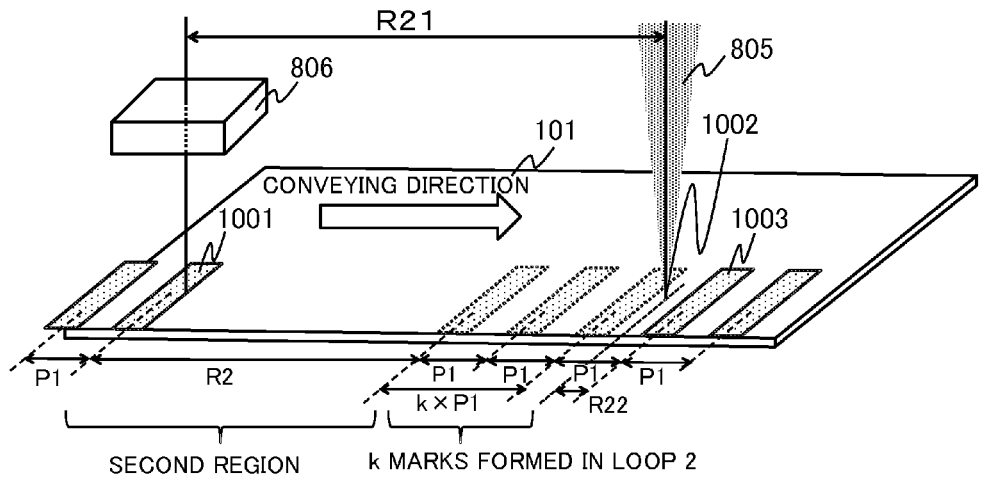
FIG. 10 illustrates a relation between a leading mark detection unit and a mark formation position at a leading mark detection time in Embodiment 2.

Next, referring to FIGS. 9B and 10, processing 1 (step S9-3 in FIG. 9A) will be described. FIG. 9B is a flowchart of processing 1 (step S9-3). FIG. 10 illustrates a relation between the leading mark detection unit 806 and a mark formation position 1002 at a time when the leading mark detection unit 806 detects a leading mark 1001.

The mark formation control unit 804 detects a distance R21 between the mark formation position 1002 and the leading mark 1001 at the detection time of the leading mark 1001 based on information relating to the leading mark 1001 detected by the leading mark detection unit 806 (step S9-3-1). The distance R21 corresponds to a remaining fabrication length from the mark formation position 1002. At the same time, the mark formation control unit 804 calculates a phase state of periodical mark formation based on the rotational amount information (rotating object surface displacement information) obtained from the rotating object driver 802. Then, the mark formation control unit 804 calculates a phase state of mark formation in the first period P1 being performed at the detection time, and detects a distance R22 from the mark formation position 1002 to a formation start position of a mark 1003 being formed (step S9-3-2).

Mark formation in the second region is performed after loop 2 finishes. Thus, the length R2 of the second region is obtained by subtracting, from the distance R21, a distance (P1-R22) from the mark formation position 1002 to a next mark formation position and a total fabrication length (k×P1) obtained through the mark formation in the first period P1 in loop 2 (step S9-3-3). This is represented by Expression (6) below.

$$R2=R21-\{(P1-R22)+k\times P1\} \quad (6)$$

Subsequently, the mark formation control unit 804 calculates the number N (fabrication number) of marks formed in the second region and the second period P2 (fabrication period) based on the calculated length R2 of the second region by Expression (1) described in Embodiment 1 (step S9-3-4).

Finally, the mark formation in the second region in FIG. 1 will be described. After loop 2 (step S9-4) is finished, the mark formation control unit 804 starts forming marks in the second period P2 calculated in processing 1 (step S9-3) in the second region (step S9-7). The mark formation control unit 804 may change mark formation conditions of the mark formation unit 805 based on a result previously obtained through condition setting so as to obtain a desired duty ratio. The mark formation control unit 804 finishes loop 3 when N marks are formed (step S9-6), and finishes the mark formation on the rotating object 101.

In the present embodiment, the mark formation control unit 804 calculates the length R2 of the second region of the rotating object 101 based on a phase state of one mark in a mark row at a detection time of the mark formed first and a distance between the fabrication position and the detection position. The mark formation control unit 804 preferably calculates, based on the length R2 of the second region, the number of marks in the second mark row formed in the second region and the second period P2 in which the second mark row is formed. Then, the mark formation control unit 804 controls the mark formation unit 805 so as to form the second mark row in the second period P2 having a phase continuity with the first mark row formed in the first region.

In this manner, the mark formation control unit 804 forms marks in the second period P2 in the second region as an unfabricated region. This allows a leading mark and a last mark to be connected with each other with the second period P2 therebetween, thereby achieving a seamless mark formation over the entire circumference of the rotating object 101. In the present embodiment, the mark row formed in the second region has a fixed period, as described in Embodiment 1 referring to FIG. 2, but a position-dependent mark row may be formed in the second region.

Embodiment 3

Next, a fabricating unit (manufacturing unit) and a method of fabricating (manufacturing) the seamless scale 102 in Embodiment 3 of the present invention will be described.

Figure 11:
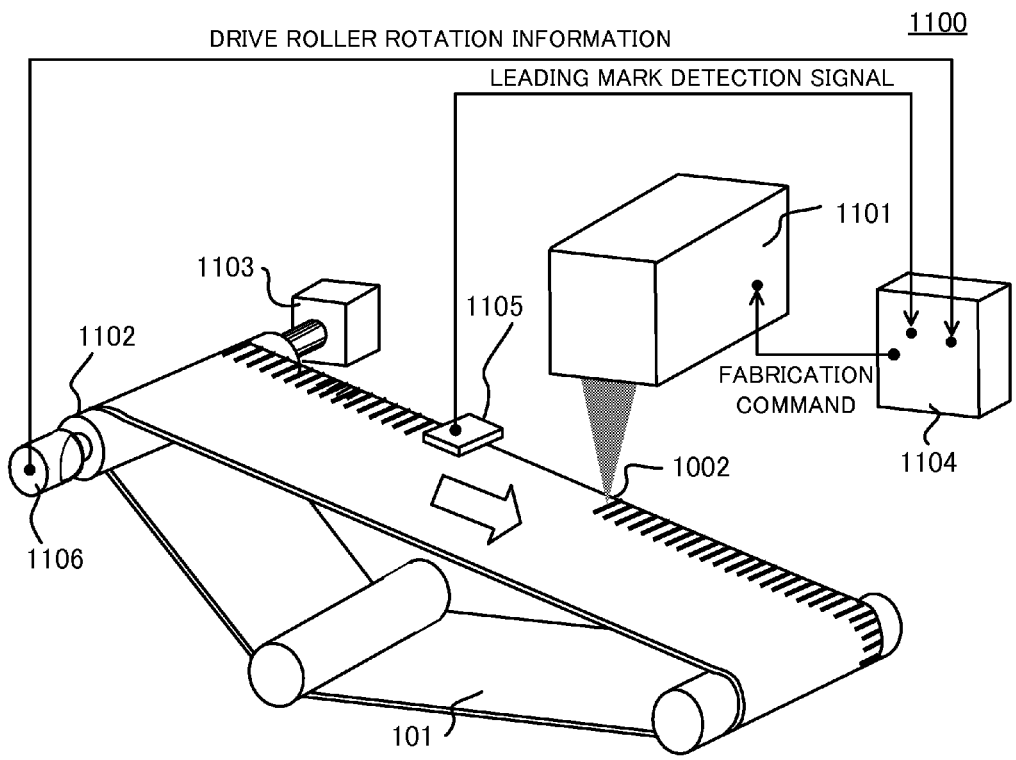
FIG. 11 is a configuration diagram of a fabricating unit for a seamless scale in Embodiment 3.

FIG. 11 is a configuration diagram of a fabricating unit 1100 for the seamless scale and schematically illustrates the fabricating unit that fabricates the seamless scale 102 on the surface of the rotating object 101. As illustrated in FIG. 11, the rotating object 101 is rotated through a drive roller 1102 by a driving motor 1103. A white arrow in FIG. 11 represents a conveying direction of the rotating object 101. The drive roller 1102 is provided with a rotary encoder 1106. A mark-forming control apparatus 1104 (mark formation control unit) calculates, based on rotational amount information obtained from the rotary encoder 1106 and a diameter of the drive roller 1102 (collectively referred to as drive roller rotation information), information of the displacement of the surface of the rotating object 101 at the mark formation position 1002. Methods of directly acquiring the information of the displacement of the surface of the rotating object 101 include a method of converting velocity information of the surface of the rotating object 101 into a displacement through a Doppler velocimeter.

The mark-forming control apparatus 1104 outputs, in accordance with a detected displacement of the surface of the rotating object 101, a fabrication command to a laser marker 1101 (mark formation unit) so as to form marks in the first period P1. The laser marker 1101 emits, based on the fabrication command input from the mark-forming control apparatus 1104, a fabrication laser so as to provide the surface of the rotating object 101 with laser fabrication in the first period P1. The laser causes plastic deformation in an illuminated region in the surface of the rotating object 101 to form the region as a scattering portion. A region of the rotating object 101 that is not provided with the fabrication remains as a regular reflective portion. A regular reflection component from the scattering portion as a fabricated portion is small relative to a regularly reflected light intensity from the regular reflective portion. Thus, a light beam reflected by the seamless scale 102 has a periodic light-dark patterned intensity distribution.

The mark formed first is rotated with a rotation of the rotating object 101 and comes close to the mark formation position 1002 from an upstream side thereof in the conveying direction (a direction of the arrow in FIG. 11). Then, a leading mark detection sensor 1105 (leading mark detection unit) disposed distant from the mark formation position 1002 by the distance R21 detects arrival of a center of the leading mark. Upon detecting the leading mark, the leading mark detection sensor 1105 outputs a leading mark detection signal to the mark-forming control apparatus 1104.

The detection of the center of the leading mark reflects a configuration that a mark formation by the laser marker 1101 is provided centering on the laser scanning position and provided on both sides thereof, and thus is a detection of the laser scanning position. The mark-forming control apparatus 1104 detects the distance R21 from the mark formation position 1002 to the leading mark based on the leading mark detection signal output from the leading mark detection sensor 1105. The leading mark detection sensor 1105 may be of the same type as the sensors 302 used in the velocity detection.

At the same time, the distance R22 from the formation start position of a mark being formed to the mark formation position 1002 can be detected based on an installation position of the leading mark detection sensor 1105 and phase formation information of a period mark forming signal. Then, the length R2 of the second region, which is an unfabricated region, of the scale is calculated as represented by Expression (6). The mark-forming control apparatus 1104 calculates the second period P2 of marks fabricated in the second region based on the length R2 of the second region. The mark-forming control apparatus 1104 controls the laser marker 1101 to form periodic marks in the second period P2 in the second region. In this manner, the fabricating unit 1100 forms the seamless scale 102 in which the regular reflective portion and the scattering portion are periodically arranged on the surface of the rotating object 101.

Next, referring to FIGS. 12A to 12D, a method of fabricating portions corresponding to the first region and the second region in FIG. 1 will be described in detail. FIGS. 12A to 12D are flowcharts of the method of fabricating the seamless scale in the present embodiment. Steps in FIGS. 12A to 12D are performed mainly based on a command from the mark-forming control apparatus 1104.

Figure 12A:
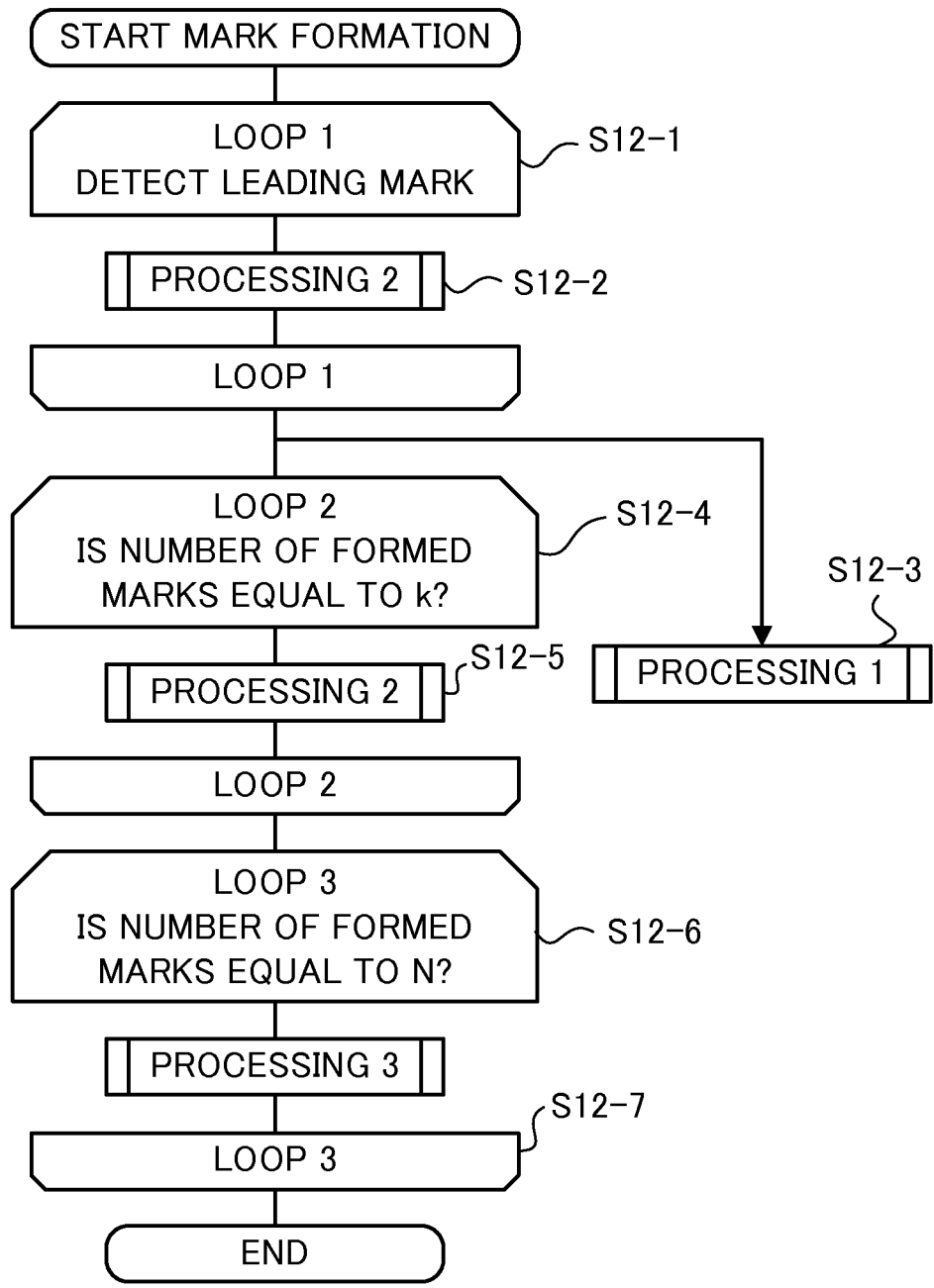
FIGS. 12A to 12D are flowcharts illustrating a method of fabricating a seamless scale in Embodiment 3.

FIG. 12A is a flowchart of forming a predetermined mark row on the surface of the rotating object 101. First, marks are formed in the first period P1 on the surface of the rotating object 101, and loop 1 is repeated until the leading mark detection sensor 1105 detects the leading mark 1001 (step S12-1). In loop 1, the mark-forming control apparatus 1104 performs processing 2 illustrated in FIG. 12C (step S12-2).

Figure 12B:
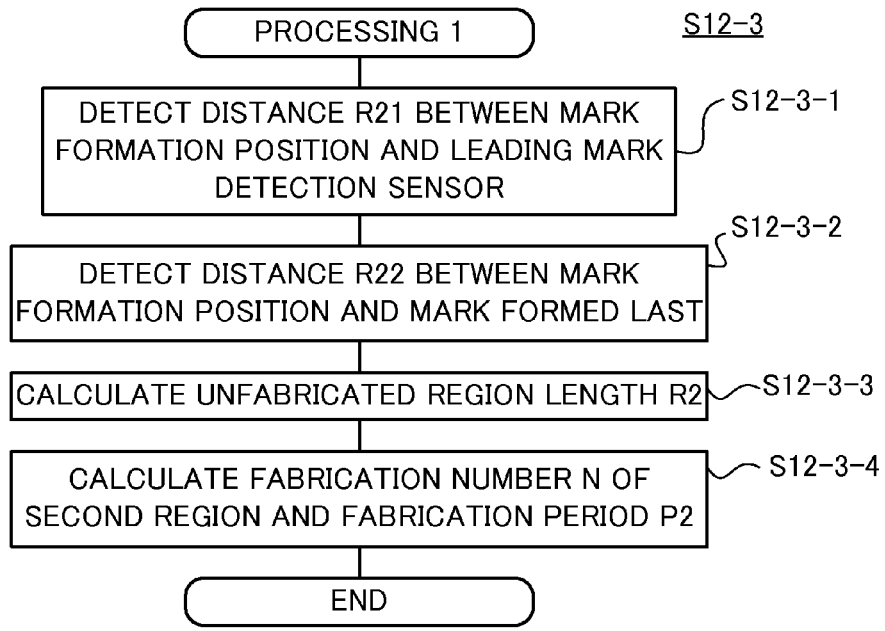
Figure 12C:
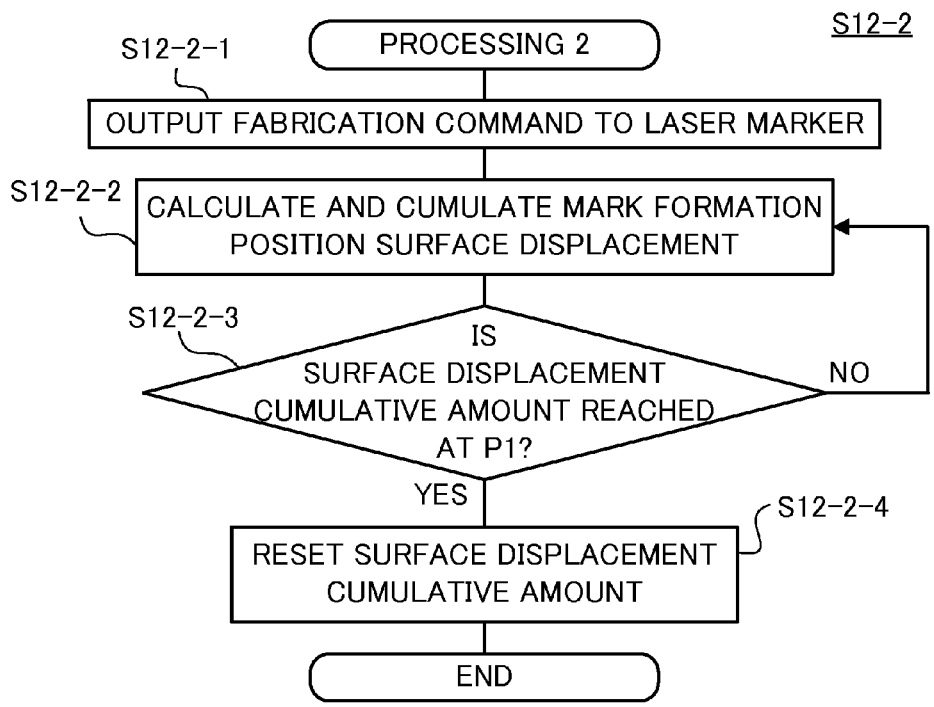

Next, referring to FIG. 12C, processing 2 will be described in detail. First in processing 2, the mark-forming control apparatus 1104 outputs a fabrication command to the laser marker 1101. The laser marker 1101 forms marks based on this fabrication command (step S12-2-1). Subsequently, the mark-forming control apparatus 1104 calculates displacement information of the surface at the mark formation position 1002 and adds this calculation result to a surface displacement cumulative amount within the mark period (step S12-2-2). Subsequently, the mark-forming control apparatus 1104 determines whether the surface displacement cumulative amount is reached at the period P1 (step S12-2-3). When the surface displacement cumulative amount is not reached at the period P1, the flow returns to the cumulative addition loop and repeats the accumulation until the surface displacement cumulative amount is reached at the period P1 (step S12-2-2). On the other hand, when the surface displacement cumulative amount is reached at the period P1, the surface displacement cumulative amount is reset (step S12-2-4), and the present processing is finished.

In this manner, the mark formation in the first period P1 on the surface of the rotating object 101 is performed until the leading mark is detected in loop 1 (step S12-1).

When the leading mark detection sensor 1105 detects arrival of the leading mark, the mark-forming control apparatus 1104 performs loop 2 (step S12-4) and processing 1 (step S12-3) to calculate the second period P2 and the number N of formed marks. First, loop 2 (step S12-4) will be described. While processing 1 (step S12-3) is performed, the rotating object 101 is rotating. Thus, the mark-forming control apparatus 1104 estimates a time duration needed for processing 1 (step S12-3) and forms k marks in the first period P1 following detection of the leading mark 1001 in processing 2 (step S12-5). The mark-forming control apparatus 1104 finishes processing 1 (step S12-3) during this time duration.

Next, referring to FIG. 12B, processing 1 (step S12-3) will be described in detail. When the leading mark detection sensor 1105 detects arrival of the center of the leading mark 1001, the mark-forming control apparatus 1104 obtains the distance R21 from the mark formation position 1002 to the leading mark 1001 at this detection time. In this manner, the mark-forming control apparatus 1104 can calculate a remaining fabrication length from the mark formation position 1002 (step S12-3-1). Simultaneously, the mark-forming control apparatus 1104 calculates a phase state of a mark formation through the rotary encoder 1106 attached to the drive roller 1102. Then, the mark-forming control apparatus 1104 calculates, based on the calculated phase state, a phase state of a mark formation in the first period P1 being performed at the detection time. The mark-forming control apparatus 1104 also calculates the distance R22 from the mark formation position 1002 to a formation start position of the mark 1003 being formed (step S12-3-2). Subsequently, the mark-forming control apparatus 1104 calculates the length R2 of the second region that is represented by Expression (6) (step S12-3-3). Then, the mark-forming control apparatus 1104 calculates, based on the length R2 of the second region, the second period P2 (fabrication period) by Expression (1) and the number N of formed marks (fabrication number) (step S12-3-4).

Finally, the mark formation in the second region illustrated in FIG. 1 will be described. After loop 2 (step S12-4) is finished, loop 3 (step S12-6) is performed. Then, the mark-forming control apparatus 1104 starts mark formation in the second period P2 in the second region in processing 3 (step S12-7).

Figure 12D:
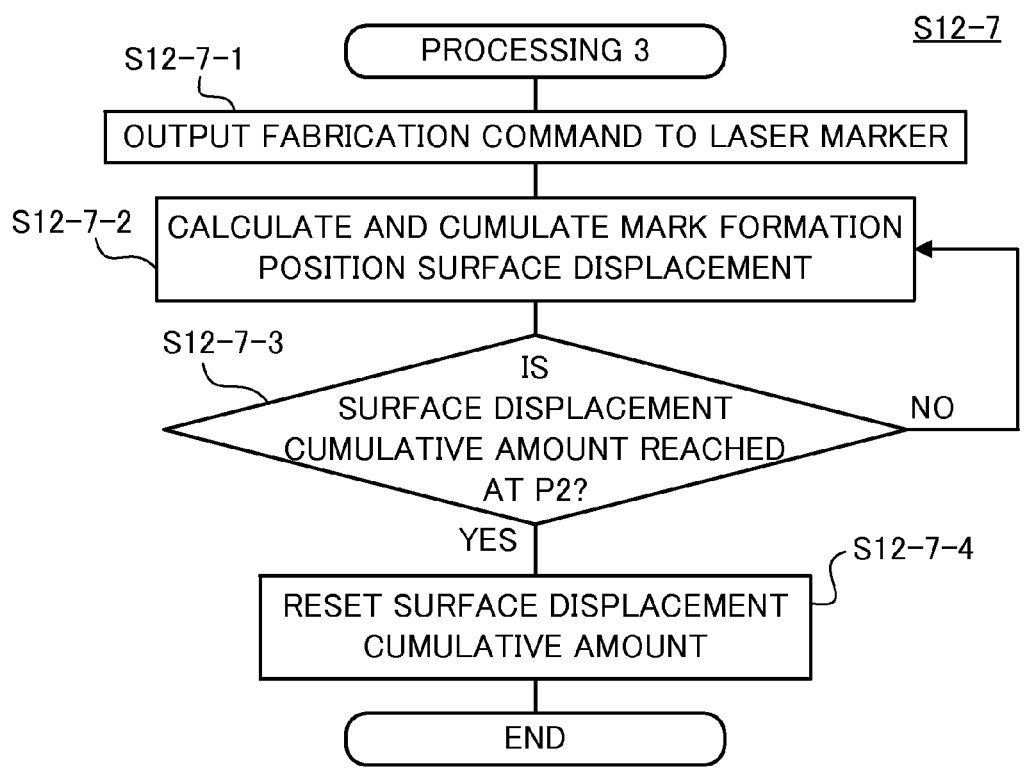

Referring to FIG. 12D, processing 3 (step S12-7) will be described. Processing 3 is started at a timing at which the fabrication command is output from the mark-forming control apparatus 1104 to the laser marker 1101, and is performed until the surface displacement cumulative amount is reached at P2. Processes other than these are the same as those in processing 2 (step S12-5), and a description thereof will be omitted. Loop 3 is finished when N marks are formed (step S12-6), and the mark formation on the rotating object 101 is finished.

In the present embodiment, the fabrication command to the laser marker 1101 is output once. However, the present embodiment is not limited thereto and may have a configuration in which a plurality of fabrication commands are output to the laser marker 1101 in accordance with laser fabrication scanning performed a plurality of times to form one mark.

In this manner, in the present embodiment, marks are formed in the second period P2 in the second region. This allows the leading mark 1001 and a last mark to be connected with each other in the second period P2, thereby achieving a seamless mark formation over the entire circumference of the rotating object 101. In the present embodiment, the mark row formed in the second region has a fixed period, as described in Embodiment 1, but a position-dependent mark row may be formed in the second region.

Embodiment 4

Next, Embodiment 4 of the present invention will be described. Embodiments 2 and 3 describe the cases where the mark formation position 1002 is detectable. On the other hand, when the mark formation position 1002 is undetectable, an adjustment is made by another detection sensor additionally provided.

Figure 13:
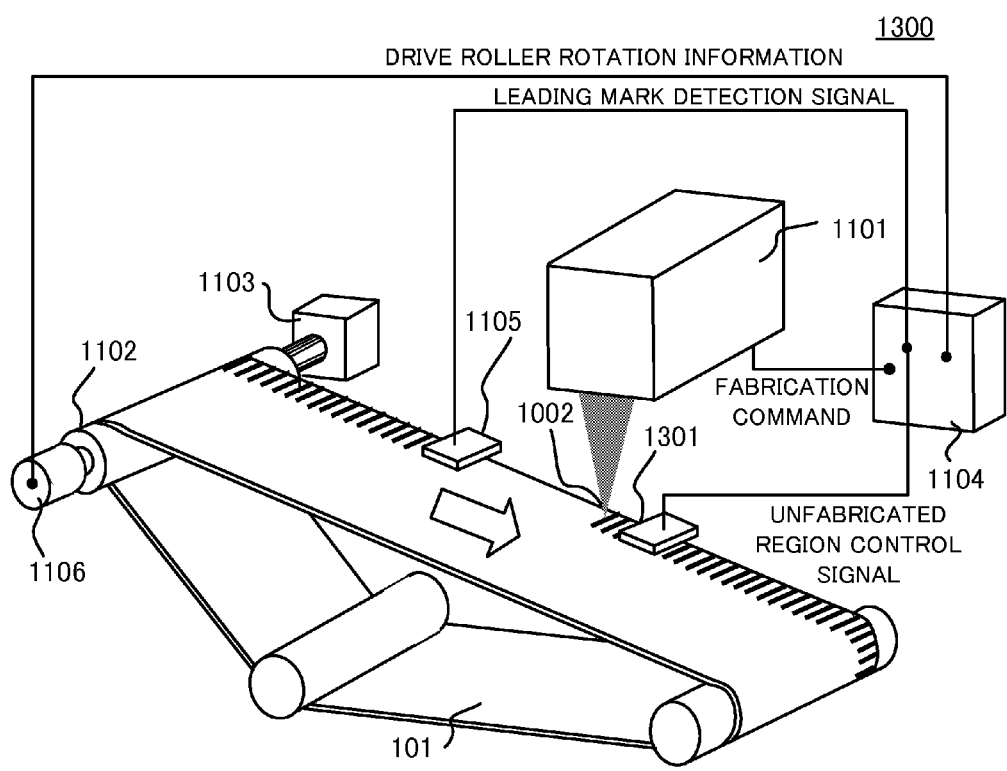
FIG. 13 is a configuration diagram of a fabricating unit for a seamless scale in Embodiment 4.

First, referring to FIG. 13, a fabricating unit for a seamless scale in the present embodiment will be described. FIG. 13 is a configuration diagram of this fabricating unit 1300 for the seamless scale. The fabricating unit 1300 in the present embodiment includes an unfabricated region control sensor 1301 (second detection unit), which is a difference from the fabricating unit 1100 in Embodiment 3. The unfabricated region control sensor 1301 is disposed downstream with respect to the leading mark detection sensor 1105 (detection unit) in the drive direction (conveying direction) of the rotating object 101 and is disposed distant therefrom by a distance Z (second distance) across the mark formation position 1002. The distance Z is previously measured. The leading mark detection sensor 1105 and the unfabricated region control sensor 1301 are fixed on an identical fixing member and provided with a mechanism (position adjust unit) whose position is adjustable with respect to the mark formation position 1002. Moving this position adjusting mechanism for these sensors disposed on the identical fixing member moves both sensors in similar manners to each other.

The unfabricated region control sensor 1301 previously performs a position adjustment as follows. In a position adjustment method in the present embodiment, a position of the unfabricated region control sensor 1301 is adjusted so that a distance R23 between the mark formation position 1002 and the unfabricated region control sensor 1301 is an integral multiple of the first period P1. Specifically, while a fabrication command signal generated from the mark-forming control apparatus 1104 is monitored, the position of the unfabricated region control sensor 1301 is adjusted so that a phase of the fabrication command signal and a phase of a signal detected when a center of a mark passes by the unfabricated region control sensor 1301 are identical to each other. Thus, synchronizing the phases between the signals enables an adjustment of setting the distance R23 to be an integral multiple of the first period P1. This makes it possible to assume a phase of the mark detected by the unfabricated region control sensor 1301 and a phase of a mark formed at the mark formation position 1002 are identical to each other.

In a state in which the position is adjusted as described above, the mark-forming control apparatus 1104 counts the number M of fabrication commands performed until the leading mark 1001 is detected by the unfabricated region control sensor 1301. This enables the mark-forming control apparatus 1104 to calculate the number of marks formed in the first period P1 in an interval of the distance R23. Then, the mark-forming control apparatus 1104 calculates the distance R23 by Expression (7) below.

$$R23 = P1 \times M \quad (7)$$

The mark-forming control apparatus 1104 calculates, based on the distance R23 thus calculated and the distance Z previously measured between the leading mark detection sensor 1105 and the unfabricated region control sensor 1301, the distance R21 between the mark formation position 1002 and the leading mark detection sensor 1105. The distance R21 can be calculated by Expression (8) below.

$$R21 = Z - R23 \quad (8)$$

These processes are performed before a mark formation is performed, and a calculated value of the distance R21 is stored in a memory and used in a mark formation processing described below. The unfabricated region control sensor 1301 may be of the same type as the leading mark detection sensor 1105.

Figure 14A:
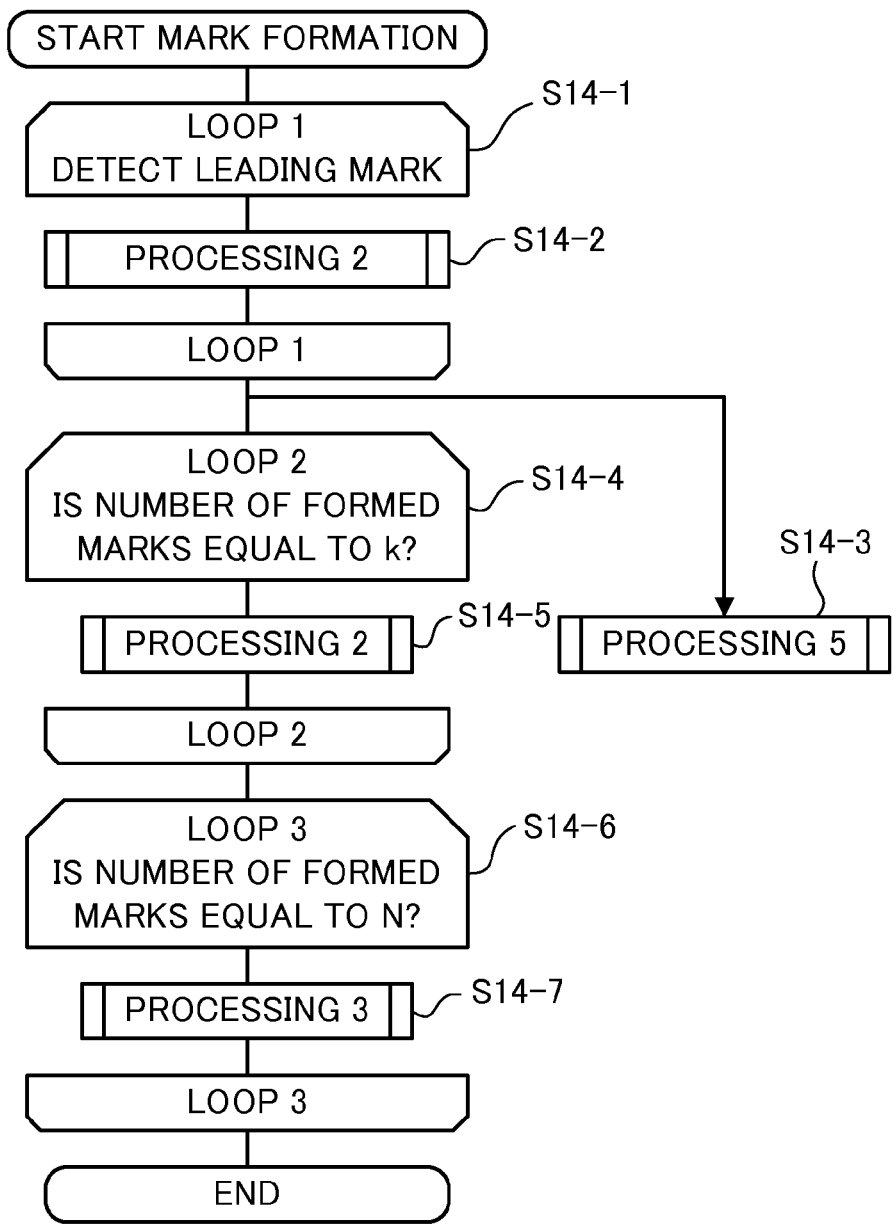
FIGS. 14A and 14B are flowcharts illustrating a method of fabricating a seamless scale in Embodiment 4.
Figure 14B:
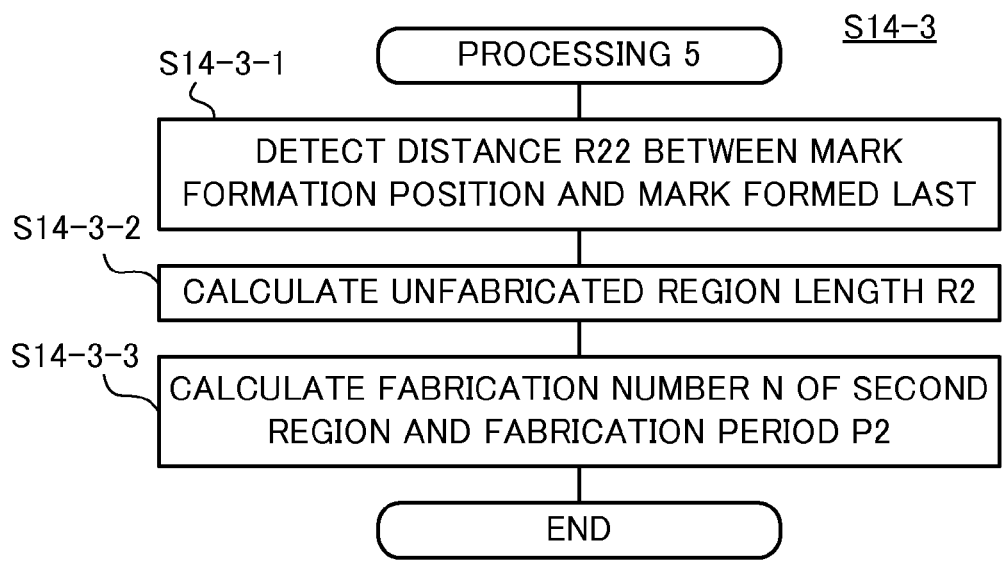

Next, referring to FIGS. 14A and 14B, a method of fabricating portions corresponding to the first region and the second region in FIG. 1 will be described in detail. FIGS. 14A and 14B are flowcharts of the method of fabricating the seamless scale in the present embodiment. Steps in FIGS. 14A and 14B are performed mainly based on a command from the mark-forming control apparatus 1104.

Once a mark formation starts, marks are first formed in the first period P1 on the surface of the rotating object 101. Then, until the leading mark detection sensor 1105 detects the leading mark 1001, loop 1 is repeated (step S14-1). In loop 1, processing 2 illustrated in FIG. 14A is performed to form marks in the first period P1 (step S14-2). Processing 2 illustrated in FIG. 14A is the same as that in Embodiment 3 illustrated in FIG. 12C, and thus a description thereof will be omitted.

When the leading mark in loop 1 (step S14-1) is detected, the processing of loop 1 is finished, and loop 2 (step S14-4) and processing 5 (step S14-3) are performed. Loop 2 (step S14-4) is a process to have a time for calculating R2, and k marks are formed in the first period P1 in the calculation time. There processes are the same as that of loop 2 in FIGS. 12A to 12D described in Embodiment 3, and thus a detailed description thereof is omitted.

Next, referring to FIG. 14B, processing 5 (step S14-3) will be described. The mark-forming control apparatus 1104 calculates a phase state of the mark formation through the rotary encoder 1106 attached to the drive roller 1102. Then, the mark-forming control apparatus 1104 calculates, based on the mark formation position 1002 at a detection time illustrated in FIG. 13, the phase state of the mark formation being performed in the first period P1. The mark-forming control apparatus 1104 also calculates the distance R22 from the mark formation position 1002 to the formation start position of the mark 1003 being formed.

Subsequently, the mark-forming control apparatus 1104 calculates the distance (P1-R22) from the mark formation position 1002 to the next mark formation position. Then, the mark-forming control apparatus 1104 calculates the length R2 of the second region by Expression (6) by using the distance R21 previously calculated by Expression (8) as described above (step S14-3-2). The mark-forming control apparatus 1104 calculates, based on a result of this calculation, the fabrication number N and the second period P2 (fabrication period) in the second region (step S14-3-3). After loop 2 (step S14-4) is finished, loop 3 (step S14-6) is performed. Then, the mark-forming control apparatus 1104 starts a mark formation in the second region. The mark formation is finished when N marks are formed.

As described above, in the present embodiment, the mark-forming control apparatus 1104 controls the position adjustment unit so that the position of the unfabricated region control sensor 1301 is adjusted to a position distant by an integral multiple of the first period, so as to adjust the distance between the leading mark detection sensor 1105 and the fabrication position. This configuration enables, when the position of the mark formation position 1002 is undetectable, the distance to be adjusted so that a phase of a mark detected by the unfabricated region control sensor 1301 additionally provided and a phase of a mark formed by the laser marker 1101 are identical to each other. The configuration that the distance between the mark formation position 1002 and the unfabricated region control sensor 1301 are previously detected and recognized allows the same fabrication processing as that in Embodiment 3 to be performed.

The distance between the mark formation position 1002 and the unfabricated region control sensor 1301 is desirably so short that a cumulative error in the mark formation in the first period P1 is sufficiently small so that the phase detected by the unfabricated region control sensor 1301 and the phase of the mark formed have no error therebetween. In the present embodiment, the unfabricated region control sensor 1301 is adjusted so that the phase detected by the unfabricated region control sensor 1301 is identical to the phase of the fabrication command signal, but the adjustment is preferably performed with taken into account any processing time delay between a time when a signal of a mark formation is output and a time when the mark formation finishes. Although the second period P2 in the unfabricated portion region is a fixed period, the second period P2 may be a continuously changing period as described in Embodiment 1. Embodiments 2 to 4 describe a method of shifting marks to be formed in the second period P2 in the second region by shifting a timing of the mark formation command, but instead a rotational velocity of the driving motor of the rotating object 101 may be changed to form marks in a desired period.

Each of the embodiments describes the case of employing the apparatus (or detector) including an optical sensor, but the present invention is not limited thereto. Each of the embodiments is also applicable to, for example, a magnetic material seamless scale including a magnetic sensor. In this seamless scale, a mark row formed on the seamless scale has a configuration in which magnetism of the seamless scale periodically changes between S pole and N pole. The magnetic sensor detects a change in a magnetic field. The magnetic sensor includes a plurality of magnetoresistive effect elements that each change resistance depending on the magnetic field, and performs addition processing on signals (voltages) output from the magnetoresistive effect elements to output a detection signal.

The magnetic material seamless scale is fabricated by first magnetizing a periodic magnetic pattern in the first period P1 in the first region on the surface of the rotating object by, for example, a magnetizing head. When a leading magnetic pattern is detected by a magnetic leading pattern detection sensor, for example, a magnetization pitch of the magnetizing head is adjusted so that a period of the magnetization is the second period P2. In the second region, the magnetization in the second period P2 is performed N times. In Embodiment 2 to 4, an optical sensor is used for a velocity measurement, a magnetic sensor is used instead in accordance with a type of the scale.

Each of the embodiments enables formation of a seamless scale having no joint portion near which an amplitude decreases and enables a highly accurate measurement (displacement measurement or velocity measurement) over an entire circumference of a rotating object. Therefore, each of the embodiments can provide a scale, a measuring apparatus, an image formation apparatus, a scale fabricating unit, and a scale fabrication method that can highly accurately detect a displacement or velocity of a rotating object by reducing influence of a joint portion.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-001201, filed on Jan. 7, 2014, which is hereby incorporated by reference wherein in its entirety.

What is claimed is:

1. A scale for measuring a displacement or velocity of a rotating object, the scale comprising:
   a first region including a first mark row with a plurality of marks arranged in a first period;
   a second region including a second mark row with a plurality of marks arranged in a second period, which is different from the first period, having a phase continuity with the first mark row in the first region; and
   a periodic mark row including the first mark row and the second mark row disposed one after another along a rotating direction of the rotating object,
   wherein the periodic mark row is disposed over an entire circumference of the rotating object, and
   wherein an expression below is satisfied:

$$P2 = P1 + \frac{R2 - \text{round}\left(\frac{R2}{P1}\right) * P1}{\text{round}\left(\frac{R2}{P1}\right)},$$

where R2 represents a length of the second region, P1 represents the first period, P2 represents the second period, and round(a) represents an integer to which a value of a is round.

2. The scale according to claim 1, wherein the second period is constant.

3. The scale according to claim 1, wherein the second period changes depending on a position in the second region.

4. The scale according to claim 3, wherein an average value of the second period is equal to a value of the second period when the second period is assumed to be constant.

5. The scale according to claim 3, wherein the second period is closer to the first period at a position closer to a boundary between the first region and the second region.

6. A measuring apparatus comprising:
   a rotating object;
   a scale on a surface of the rotating object;
   a sensor configured to detect a mark row on the scale; and
   a measurement unit configured to measure a relative displacement or relative velocity between the rotating object and the sensor,
   wherein the scale includes:
     a first region including a first mark row with a plurality of marks arranged in a first period;
     a second region including a second mark row with a plurality of marks arranged in a second period, which is different from the first period, having a phase continuity with the first mark row in the first region; and a periodic mark row including the first mark row and the second mark row disposed one after another along a rotating direction of the rotating object, wherein the periodic mark row is disposed over an entire circumference of the rotating object, and wherein an expression below is satisfied:

$$P2 = P1 + \frac{R2 - \text{round}\left(\frac{R2}{P1}\right) * P1}{\text{round}\left(\frac{R2}{P1}\right)},$$

where R2 represents a length of the second region, P1 represents the first period, P2 represents the second period, and round(a) represents an integer to which a value of a is round.

7. The measuring apparatus according to claim 6, wherein:

the sensor includes a first sensor and a second sensor, and the measurement unit measures the relative velocity between the rotating object and the sensor based on a distance between the first sensor and the second sensor and a time duration required by an identical mark, among the plurality of marks of the first or second mark row on the scale, to travel between the first sensor and the second sensor.

8. The measuring apparatus according to claim 6, wherein:

the first and second mark rows are configured to periodically change a reflectance or transmittance of light, and the sensor includes a photodetector configured to detect reflected light or transmitted light from the scale.

9. The measuring apparatus according to claim 8, wherein:

the photodetector of the sensor includes a plurality of light receiving elements, and signals output from the light receiving elements are added and output as a detection signal.

10. The measuring apparatus according to claim 6, wherein:

the first and second mark rows are configured to periodically change magnetism of the scale between an S pole and an N pole, and the sensor is a magnetic sensor configured to detect a change in a magnetic field.

11. The measuring apparatus according to claim 10, wherein:

the magnetic sensor includes a plurality of magnetoresistive effect elements whose each resistance changes depending on the magnetic field, and signals output from the magnetoresistive effect elements are added and output as a detection signal.

12. An image formation apparatus comprising:

a rotating object;

a scale on a surface of the rotating object;

a sensor configured to detect a mark row on the scale;

a measurement unit configured to measure a relative displacement or relative velocity between the rotating object and the sensor;

a motor configured to rotate the rotating object; and a controller configured to control the motor based on a measurement result of the measurement unit, wherein the scale includes:

a first region including a first mark row with a plurality of marks arranged in a first period;

a second region including a second mark row with a plurality of marks arranged in a second period, which is different from the first period, having a phase continuity with the first mark row in the first region; and a periodic mark row including the first mark row and the second mark row disposed one after another along a rotating direction of the rotating object, wherein the periodic mark row is disposed over an entire circumference of the rotating object, and wherein an expression below is satisfied:

$$P2 = P1 + \frac{R2 - \text{round}\left(\frac{R2}{P1}\right) * P1}{\text{round}\left(\frac{R2}{P1}\right)},$$

where R2 represents a length of the second region, P1 represents the first period, P2 represents the second period, and round(a) represents an integer to which a value of a is round.

\* \* \* \* \*